US012746920B2

(12) United States Patent
Hori et al.

(10) Patent No.: US 12,746,920 B2
(45) Date of Patent: Sep. 29, 2026

(54) TRAVELING CONTROL APPARATUS

(71) Applicant: SUBARU CORPORATION, Tokyo (JP)

(72) Inventors: Hayato Hori, Tokyo (JP); Syohei Yokouchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 225 days.

(21) Appl. No.: 18/393,401

(22) Filed: Dec. 21, 2023

(65) Prior Publication Data

US 2024/0116509 A1 Apr. 11, 2024

Related U.S. Application Data

(63) Continuation of application No. PCT/JP2021/039337, filed on Oct. 25, 2021.

(51) Int. Cl.
*B60W 30/165* (2020.01)

(52) U.S. Cl.
CPC ... *B60W 30/165* (2013.01); *B60W 2554/4045* (2020.02); *B60W 2554/80* (2020.02)

(58) Field of Classification Search
CPC ........... B60W 30/0956; B60W 30/143; B60W 30/16; B60W 30/165; B60W 30/18163;
(Continued)

(56) References Cited

U.S. PATENT DOCUMENTS

2009/0234553 A1* 9/2009 Sekiguchi ............. B60W 30/16 701/96
2009/0248270 A1* 10/2009 Sekiguchi ........... B60W 10/184 701/96
(Continued)

FOREIGN PATENT DOCUMENTS

JP H07-334790 A 12/1995
JP 2012-51503 A 3/2012
(Continued)

OTHER PUBLICATIONS

International Search Report issued in International Application No. PCT/JP2021/039337, dated Dec. 7, 2021 w/ English Translation.
(Continued)

*Primary Examiner* — Peter D Nolan
*Assistant Examiner* — Ce Li Li
(74) *Attorney, Agent, or Firm* — Rimon P.C.

(57) ABSTRACT

A traveling control apparatus includes a computer device. The computer device performs control that causes a first vehicle to travel at a set constant vehicle speed or to travel following a second vehicle traveling in front of the first vehicle. The computer device includes a control target setting unit and a following control unit. The control target setting unit performs a determination of conformity between a third vehicle detected on a merging lane and a vehicle intending to enter a position immediately before the first vehicle. Based on a result of the determination, the control target setting unit sets the third vehicle as a merging vehicle serving as a target to follow. The following control unit performs control to cause the first vehicle to travel following the merging vehicle set by the control target setting unit as the target to follow.

20 Claims, 11 Drawing Sheets

(58) Field of Classification Search
CPC ............ B60W 40/02; B60W 2520/10; B60W 2554/4045; B60W 2554/4049; B60W 2554/80; B60W 2555/20; B60W 2720/10
See application file for complete search history.

(56) References Cited

U.S. PATENT DOCUMENTS

| | | | | |
|---|---|---|---|---|
| 2012/0065863 | A1 | 3/2012 | Takagi et al. | |
| 2017/0355368 | A1* | 12/2017 | O'Dea | B60W 30/14 |
| 2019/0375400 | A1* | 12/2019 | Zhang | B60W 30/09 |
| 2020/0010088 | A1 | 1/2020 | Kokaki | |
| 2021/0053558 | A1* | 2/2021 | Costa | B60W 30/09 |
| 2021/0089052 | A1* | 3/2021 | Cho | G05D 1/0223 |
| 2021/0323574 | A1* | 10/2021 | Yoo | G01C 21/3407 |
| 2022/0194372 | A1* | 6/2022 | Kitajima | B60W 30/143 |
| 2023/0271611 | A1* | 8/2023 | Masui | B60W 30/09<br>701/96 |
| 2024/0034358 | A1* | 2/2024 | Grard | B60W 60/0011 |
| 2024/0174230 | A1* | 5/2024 | Saito | B60W 30/143 |
| 2024/0208491 | A1* | 6/2024 | Kato | B62D 6/002 |

FOREIGN PATENT DOCUMENTS

| | | | |
|---|---|---|---|
| JP | 2017-207812 | A | 11/2017 |
| JP | 2019-180074 | A | 10/2019 |
| JP | 2021-005189 | A | 1/2021 |
| WO | 2010-116499 | A1 | 10/2010 |
| WO | 2018/158875 | A1 | 9/2018 |

OTHER PUBLICATIONS

Office Action dated Feb. 18, 2025, issued in corresponding Japan Patent Application No. 2023-555900, 6 pages.
Office Action dated Oct. 15, 2024, from corresponding Japanese Patent Application No. 2023-555900, 6 pages.

* cited by examiner

TRAVELING CONTROL APPARATUS

CROSS REFERENCES TO RELATED APPLICATIONS

This application is a continuation of International Application No. PCT/JP2021/039337, filed on Oct. 25, 2021, the entire contents of which are hereby incorporated by reference.

BACKGROUND

The disclosure relates to a traveling control apparatus to be mounted in a vehicle.

Japanese Unexamined Patent Application Publication No. 2017-207812 discloses a process to be executed by a vehicle intending to merge into a main lane. The vehicle includes a drive support unit, a communication unit, a range acquisition unit, and a vehicle setting unit. The drive support unit executes a process for calculating a target traveling speed while the vehicle is traveling on a merging lane. The communication unit communicates with other vehicles traveling on the main lane into which the vehicle intends to merge. The range acquisition unit acquires a detection area in which another vehicle estimated to reach a merging point at the same time as the vehicle intending to merge is detected among the other vehicles traveling on the main lane. When one or more vehicles communicable with the communication unit are present within the detection area acquired by the range acquisition unit, the vehicle setting unit sets the one or more vehicles as vehicles to be merged, i.e., the vehicle is to merge into a position before the vehicles. When the vehicles to be merged are set, the driving support unit calculates the target traveling speed of the vehicle for merging into the position before the vehicles to be merged.

SUMMARY

An aspect of the disclosure provides a traveling control apparatus including a computer device. The computer device is configured to perform control that causes a first vehicle to travel at a set constant vehicle speed or to travel following a second vehicle traveling in front of the first vehicle. The computer device includes a control target setting unit and a following control unit. The control target setting unit is configured to perform a determination of conformity between a third vehicle detected on a merging lane and a vehicle intending to enter a position immediately before the first vehicle, and set, based on a result of the determination, the third vehicle as a merging vehicle serving as a target to follow. The merging lane merges with a traveling lane on which the first vehicle travels. The following control unit is configured to perform control to cause the first vehicle to travel following the merging vehicle set by the control target setting unit as the target to follow. In the determination of the conformity, the control target setting unit is configured to perform a process for comparing time to contact between the first vehicle and the third vehicle subjected to the determination with a threshold, and refrain from setting the third vehicle subjected to the determination as the target to follow when the time to contact is less than or equal to the threshold.

An aspect of the disclosure provides a traveling control apparatus including a computer device. The computer device is configured to perform control that causes a first vehicle to travel at a set constant vehicle speed or to travel following a second vehicle traveling in front of the first vehicle. The computer device includes a control target setting unit and a following control unit. The control target setting unit is configured to perform a determination of conformity between a third vehicle detected on a merging lane and a vehicle intending to enter a position immediately before the first vehicle, and set, based on a result of the determination, the third vehicle as the merging vehicle serving as a target to follow. The merging lane merges with a traveling lane on which the first vehicle travels. The following control unit is configured to perform control to cause the first vehicle to travel following the merging vehicle set by the control target setting unit as the target to follow. In the determination of the conformity, the control target setting unit is configured to perform a process for comparing an acceleration rate of the third vehicle subjected to the determination with a threshold. The threshold is selected based on a relative speed between the first vehicle and the third vehicle.

An aspect of the disclosure provides a traveling control apparatus including a computer device. The computer device is configured to perform control that causes a first vehicle to travel at a set constant vehicle speed or to travel following a second vehicle traveling in front of the first vehicle. The computer device includes circuitry configured to: perform a determination of conformity between a third vehicle detected on a merging lane merging with a traveling lane on which the first vehicle travels and a vehicle intending to enter a position immediately before the first vehicle; set, based on a result of the determination, the third vehicle as the merging vehicle serving as a target to follow; perform control to cause the first vehicle to travel following the merging vehicle set by the control target setting unit as the target to follow. The circuitry is configured to, in the determination of the conformity, perform the control target setting unit is configured to perform a process for comparing time to contact between the first vehicle and the third vehicle subjected to the determination with a threshold; and refrain from setting the third vehicle subjected to the determination as the target to follow when the time to contact is less than or equal to the threshold.

An aspect of the disclosure provides a traveling control apparatus including a computer device. The computer device is configured to perform control that causes a first vehicle to travel at a set constant vehicle speed or to travel following a second vehicle traveling in front of the first vehicle. The computer device includes circuitry configured to: perform a determination of conformity between a third vehicle detected on a merging lane merging with a traveling lane on which the first vehicle travels and a vehicle intending to enter a position immediately before the first vehicle; set, based on a result of the determination, the third vehicle as the merging vehicle serving as a target to follow, perform control to cause the first vehicle to travel following the merging vehicle set by the control target setting unit as the target to follow. The circuitry is configured to, in the determination of the conformity, perform the control target setting unit is configured to perform a process for comparing an acceleration rate of the third vehicle subjected to the determination with a threshold. The threshold is selected based on a relative speed between the first vehicle and the third vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
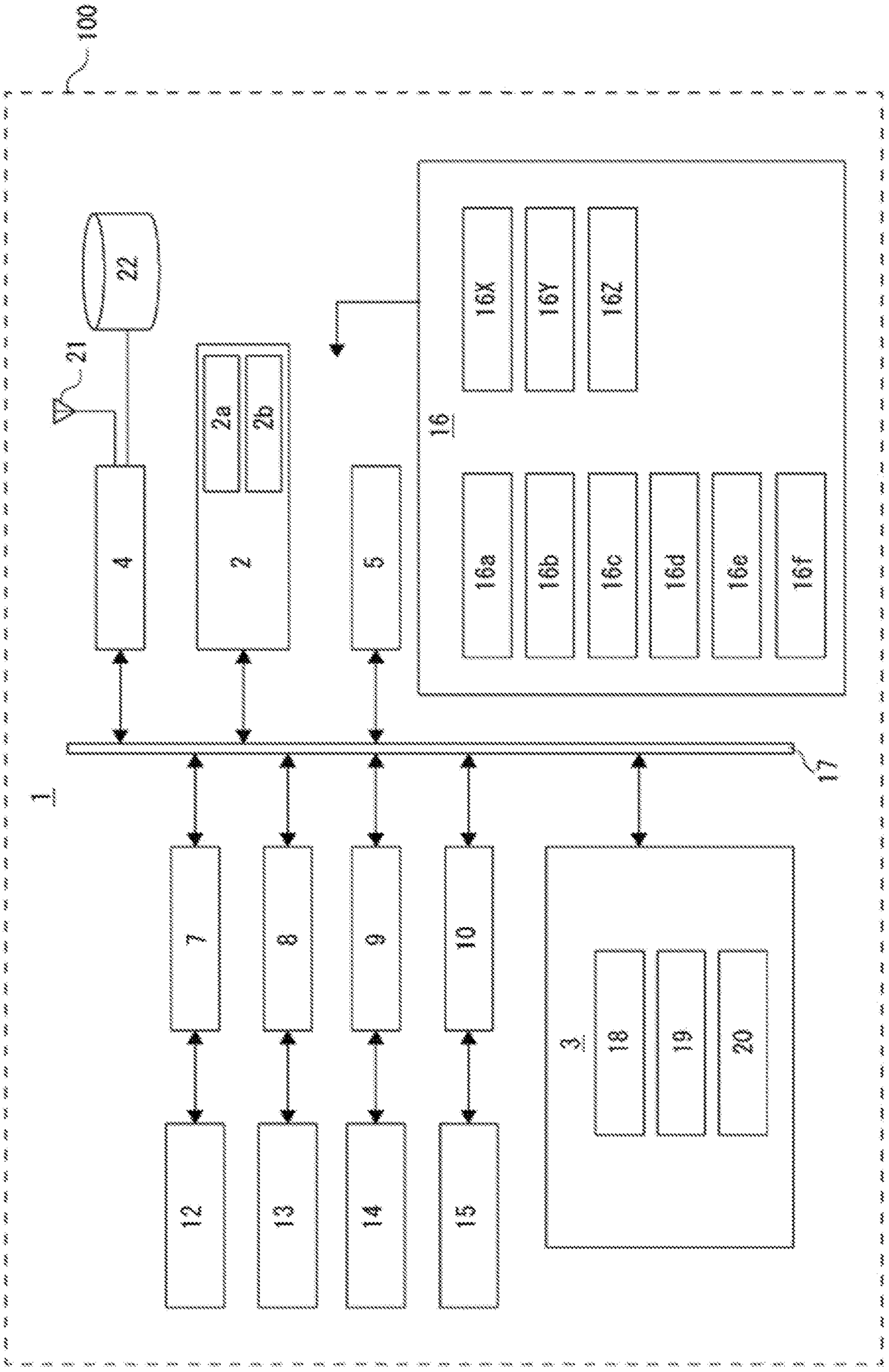
FIG. 1 is a block diagram of a vehicle control system according to one example embodiment.

In adaptive cruise control (ACC), traveling control is performed so that a target inter-vehicular distance is maintained between an own vehicle and a preceding vehicle by setting a target acceleration rate based on a speed of the own vehicle, a speed of the preceding vehicle, and an inter-vehicular distance between the own vehicle and the preceding vehicle.

At a merging area of an interchange or a rest area of a limited highway such as an expressway, a driver of a vehicle traveling on a main lane of the limited highway often turns off the ACC.

In normal conditions, the ACC sets a preceding vehicle traveling in front of the own vehicle as a target to be followed by the own vehicle at an inter-vehicular distance, and controls the own vehicle so that an appropriate inter-vehicular distance is maintained with respect to the preceding vehicle. Another vehicle traveling on a merging lane is set as a preceding vehicle when merging into the traveling lane of the own vehicle. However, the other vehicle merging into the traveling lane of the own vehicle often travels at a low speed, which forces a driver of the own vehicle to cancel the ACC to maintain an appropriate inter-vehicular distance with respect to the merging vehicle, depending on a difference between the own vehicle and the merging vehicle. This lowers an operation rate of the ACC.

However, if a vehicle traveling on the merging lane is unconditionally set as the target of the ACC to follow, the control to maintain an inter-vehicular distance is executed also with respect to a vehicle having no intention to enter a position before the own vehicle. This causes abrupt braking of the own vehicle, hindering the own vehicle from traveling smoothly.

It is desirable to provide a traveling control apparatus that makes it possible to achieve smooth traveling while maintaining ACC even upon merging.

In the following, some example embodiments of a traveling control apparatus of the disclosure are described with reference to the accompanying drawings. The traveling control apparatus is to be mounted in a vehicle, and serves as a part of a vehicle control system of the vehicle.

In the following description, a "merging vehicle" corresponds to a vehicle present on a merging lane for merging into a lane on which an own vehicle is traveling and detected by the own vehicle. According to an example embodiment, a merging vehicle traveling on a merging lane and intending to enter a traveling lane on which the own vehicle is traveling is set as a target of the ACC to follow, for example.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Configuration of Vehicle Control System

FIG. 1 illustrates an exemplary configuration of a vehicle control system 1. Being mounted in a vehicle 100, the vehicle control system 1 performs traveling control of the vehicle 100 (hereinafter also referred to as an own vehicle).

The vehicle control system 1 includes multiple pieces of hardware. As one of the multiple pieces of hardware in the vehicle control system 1, a traveling control apparatus 2 according to an example embodiment may be provided.

The vehicle control system 1 includes the traveling control apparatus 2. The vehicle control system 1 may perform adaptive cruise control (ACC) to cause the own vehicle to travel at a set vehicle speed or to travel following a preceding vehicle.

Note that FIG. 1 illustrates main components relevant to the disclosure out of the components of the vehicle control system 1. The vehicle control system 1 may thus include components not illustrated in FIG. 1 or may not include all the components illustrated in FIG. 1.

The vehicle control system 1 may include the traveling control apparatus 2, an outside environment recognition apparatus 3, a map locator 4, a communicator 5, an engine processor 7, a transmission processor 8, a brake processor 9, a steering processor 10, an engine-related actuator 12, a transmission-related actuator 13, a brake-related actuator 14, a steering-related actuator 15, and a sensor-operator unit 16.

The vehicle control system 1 may further include a global navigation satellite system (GNSS) receiver 21 that is a receiver for a GNSS, for example, and a map database (DB) 22 that includes high resolution map data.

The traveling control apparatus 2, the outside environment recognition apparatus 3, the communicator 5, the map locator 4, the engine processor 7, the transmission processor 8, the brake processor 9, and the steering processor 10 may be mutually coupled via a bus 17.

The outside environment recognition apparatus 3 may be an apparatus configured to recognize an outside environment of the vehicle 100 to acquire outside environment information. The outside environment recognition apparatus 3 may be a microcomputer including, for example, a central processing unit (CPU), a read only memory (ROM), or a random access memory (RAM).

The outside environment recognition apparatus 3 may include a stereo camera 18 configured to capture an image of an environment in front of the vehicle 100, an image processor 19 configured to conduct various processes on the images acquired from the stereo camera 18, a radar device 30 such as a millimeter-wave radar or a laser radar, and another sensing device.

The stereo camera 18 may include multiple imaging units. Each of the imaging unit may include a camera optical system and an imaging device. An image of a subject may be focused on an imaging face of the imaging device by the camera optical system, generating electric signals on a pixel unit basis depending on the volume of received light. Each of the imaging units may be provided to enable ranging based on a stereo imaging method. The electric signal generated at each of the imaging units may be converted into a digital image signal indicating a luminance value on a pixel unit basis based on a predetermined gradation through an A/D conversion or a predetermined correction process, and may be supplied to the image processor 19.

The image processor 19 may be a microcomputer including, for example, a CPU, a ROM, or a RAM. To recognize the outside environment, the image processor 19 may execute predetermined image processing on captured image data obtained by the imaging units of the stereo camera 18, for example. The image processing by the image processor 19 may be performed using a memory such as a non-volatile memory included in the outside environment recognition apparatus 3.

The image processor 19 may execute various kinds of image processing based on the captured image data obtained by stereo imaging to acquire information on the environment in front of the own vehicle including a data on a three-dimensional object or a dividing lane (e.g., a center line or a lane dividing line) present in front of the own vehicle. Thereafter, the image processor 19 may detect a road or lane on winch the own vehicle is traveling (an own vehicle traveling lane) and an object present on the own vehicle traveling lane based on the information acquired. For example, the image processor 19 may detect a preceding vehicle traveling in front of the own vehicle, a lane line, a guardrail extending along the road, a sidewall of a curbstone, a three-dimensional object such as a vehicle, a stop line, a traffic light, a railroad crossing, a crosswalk, and a lane. Further, the image processor 19 may be configured to detect a vehicle traveling in parallel to the own vehicle depending on a view angle or an arrangement of the stereo camera 18. The vehicle traveling in parallel to the own vehicle may be a merging vehicle traveling on a merging lane, for example.

Further, the image processor 19 may be configured to recognize an object present around the own vehicle and a behavior of the object based on the image captured by the stereo camera 18. For example, the image processor 19 may further configured to recognize speeds, acceleration rates, changes in traveling directions, and lighting states of turn signal lamps of the preceding vehicle and the merging vehicle. Note that the acceleration rate may be an acceleration rate taking a positive value for acceleration or an acceleration rate taking a negative value for deceleration.

The image processor 19 may calculate the various pieces of surrounding environment information described above per frame of the captured image data, and may store the calculated information in the memory in sequence.

The traveling control apparatus 2 may be a microcomputer including a CPU, a ROM, or a RAM, for example. The traveling control apparatus 2 may execute various traveling control processes to assist driving of the own vehicle based on data received from various sensors in the outside environment recognition apparatus 3, the map locator 4, the communicator 5, and the sensor-operator unit 16 or operation input information, for example.

The traveling control apparatus 2 may be connected to the respective processors including the engine processor 7, the transmission processor 8, the brake processor 9, and the steering processor 10 via the bus 17. The traveling control apparatus 2 may be configured to establish mutual data communication with these processors. The traveling control apparatus 2 may send a command to some of the above-described processors to be operated for conducting an operation relevant to the driver assistance (driver assistance control).

Examples of the driver assistance control executed by the traveling control apparatus 2 may include automated lane keeping control, autonomous emergency braking (AEB) control, adaptive cruise control (ACC), and automated lane changing control.

As illustrated in FIG. 1, the traveling control apparatus 2 may include a control target setting unit 2*a* and a following control unit 2*b*. These units may perform processes relevant to the ACC, and these processes may be implemented by program modules.

The control target setting unit 2*a* may perform a process for setting a target of the ACC to follow. The control target setting unit 2*a* may be configured to set a preceding vehicle traveling in front of the own vehicle as the target of the ACC to follow in normal conditions. However, according to the present example embodiment, the control target setting unit 2*a* may be also configured to set a merging vehicle detected on a merging lane as a target of the ACC to follow. For example, the control target setting unit 2*a* performs a determination of conformity between a vehicle detected on the merging lane that merges with the lane on which the own vehicle is traveling and a vehicle intending to enter the position before the own vehicle, and sets, based on a result of the determination, the vehicle detected on a merging vehicle serving as a target to follow.

The following control unit 2*b* may perform a process for setting a target acceleration rate to cause the own vehicle to travel following the target of ACC to follow (e.g., a preceding vehicle) while maintaining a target inter-vehicular distance, for example. According to the present example embodiment, the following control unit 2*b* performs a merge-to-follow process when a merging vehicle is set as the target to follow. In the merge-to-follow process, for example, an inter-vehicular distance shorter than the target inter-vehicular distance to be set in the ordinary process for causing the own vehicle to travel following a preceding vehicle traveling on the same lane as the own vehicle is allowable.

The communicator 5 may be configured to establish a network communication, an inter-vehicular communication (a so-called V2V communication), or a road-to-vehicle communication. The traveling control apparatus 2 may acquire various pieces of information received by the communicator 5. The communicator 5 may be further configured to acquire various pieces of information, such as information on a surrounding environment around a current location and road information, via a network communication such as the Internet.

The sensor-operator unit 16 may be an assembly of various sensors and operators provided in the vehicle 100. Examples of the sensors in the sensor-operator unit 16 may include a vehicle speed sensor 16*a* that detects a speed of the own vehicle, an engine revolution sensor 16*b* that detects the number of revolutions of an engine, an accelerator position sensor 16*c* that detects an accelerator position based on the degree of depressing of an accelerator pedal, a steering angle sensor 16*d* that detects a steering angle, a yaw rate sensor 16*e* that detects a yaw rate, and a brake switch 16*f* that turns on or off in accordance with activation or inactivation of the brake pedal.

Examples of the operators in the sensor-operator unit 16 may include an ignition switch 16X that sends a command to start or stop the engine, an operation lever 16Y of a turn-signal lamp, and an operator 16Z that switches a control mode of an operation relevant to driver assistance control, such as ACC, between ON and OFF.

Note that these examples are mere examples and various kinds of sensors and operators may be provided other than those described above.

Various detection signals and operation signals may be sent from the sensor-operator unit 16 to components to be operated, such as the traveling control apparatus 2, the engine processor 7, the transmission processor 8, the brake processor 9, and the steering processor 10.

The engine processor 7 may control various actuators provided as the engine-related actuator 12 based on detection signals received from predetermined sensors in the sensor-operator unit 16 and operational input information received from predetermined operators in the sensor-operator unit 16, for example.

As the engine-related actuator 12, various actuators relevant to engine driving, such as a throttle actuator that drives a throttle valve and an injector that injects a fuel may be provided, for example.

The transmission processor 8 may control various actuators provided as the transmission-related actuator 13 based on detection signals received from predetermined sensors in the sensor-operator unit 16 and operational input information received from predetermined operators in the sensor-operator unit 16, for example.

As the transmission-related actuator 13, an actuator that performs speed change control of an automatic transmission may be provided, for example.

The brake processor 9 may control various actuators provided as the brake-related actuator 14 based on detection signals received from predetermined sensors in the sensor-operator unit 16 and operational input information received from predetermined operators in the sensor-operator unit 16, for example.

As the brake-related actuator 14, an actuator that performs a brake-related operation, such as a hydraulic control actuator that controls hydraulic pressure of an output from a brake booster to a master cylinder and hydraulic pressure inside a brake liquid pipe may be provided, for example.

The steering processor 10 may determine necessary steering torque based on data on a target steering angle received from the traveling control apparatus 2. The steering processor 10 may control the steering-related actuator 15 based on the determined steering torque to achieve necessary automated steering.

The map locator 4 may be configured to identify a current position of the vehicle 100 with high accuracy using the GNSS receiver 21 and the map DB 22. For example, the map locator 4 may be configured to identify not only a road on which the vehicle 100 is traveling but also a traveling lane on which the vehicle 100 is traveling.

For example, the traveling control apparatus 2 may recognize a presence of a merging lane of a limited highway including an expressway, and a start point and an end point of the merging lane, based on the information received from the map locator 4. Further, the traveling control apparatus 2 may recognize the lane on which the vehicle 100 is traveling.

Note that examples of the map locator 4 may include not only a locator in a narrow sense that is used to determine a traveling route in automated driving but also a navigation system using a GNSS. That is, the map locator 4 may be configured to acquire a current position and surrounding road information.

2. Outline of Merging Control

Figure 2:
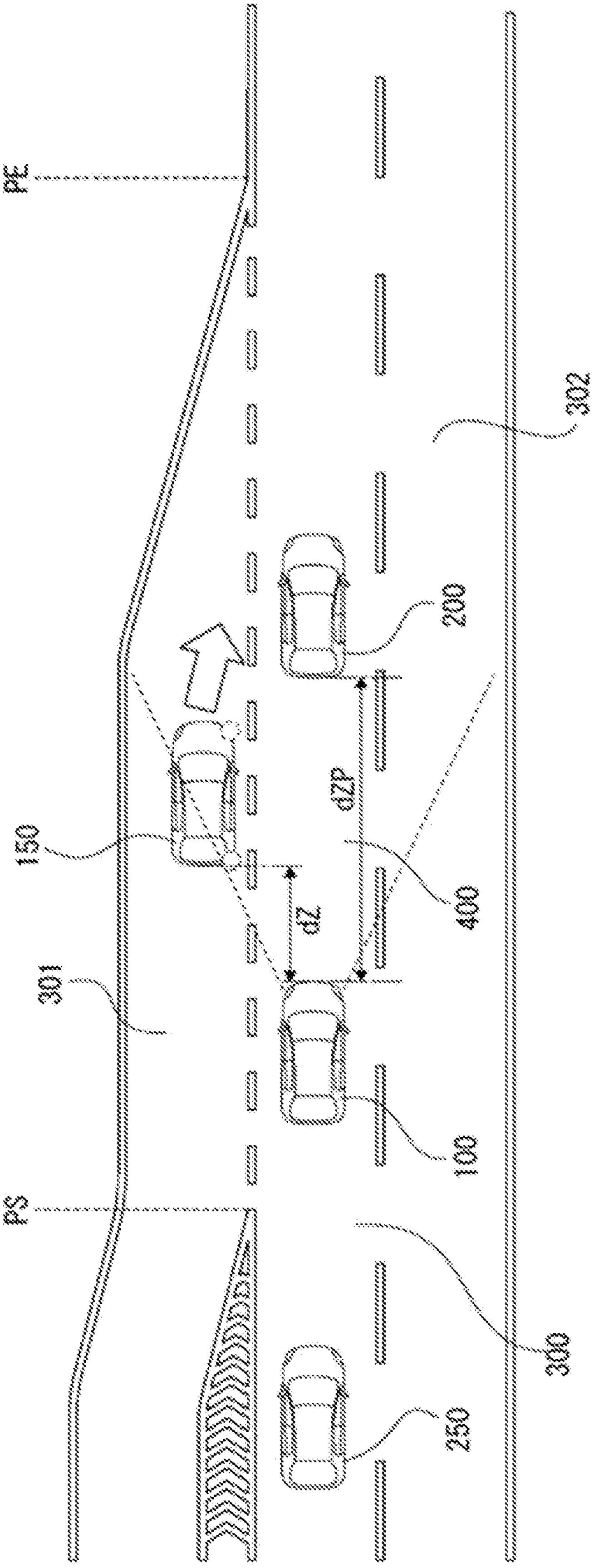
FIG. 2 is an explanatory diagram for describing a merging vehicle set as a target to follow at the time of merging according one example embodiment.
Figure 3A:
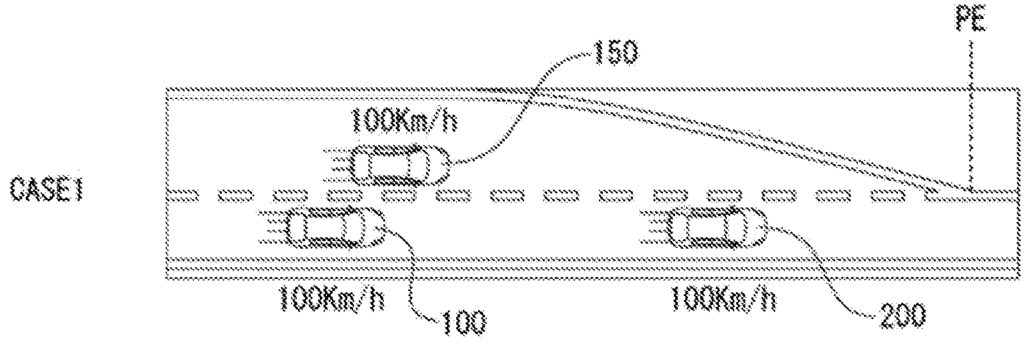
FIGS. 3A to 3D are explanatory diagrams for describing a case where the merging vehicle is set as the target to follow and a case where the merging vehicle is not set as the target to follow according to one example embodiment.
Figure 3B:
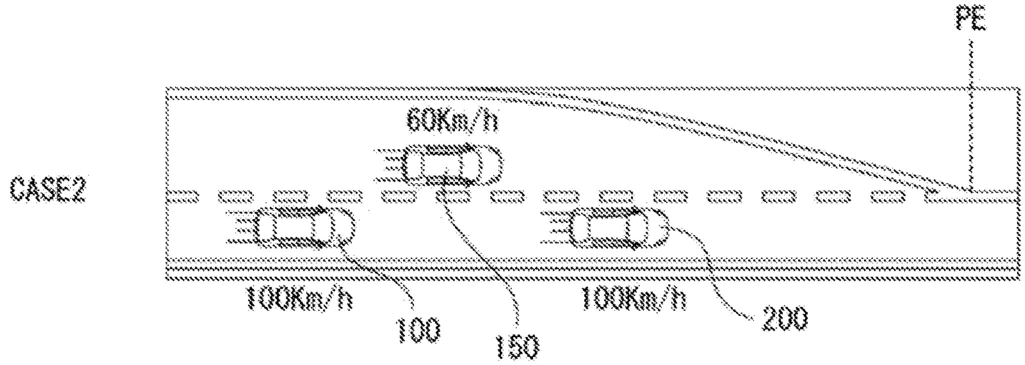
Figure 3C:
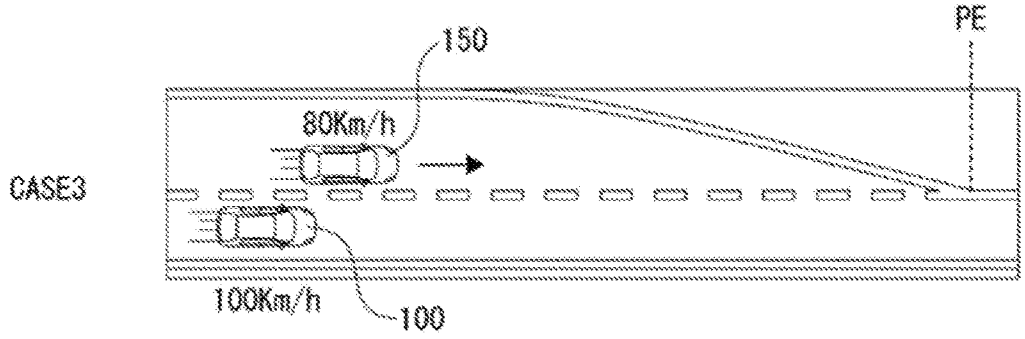
Figure 3D:
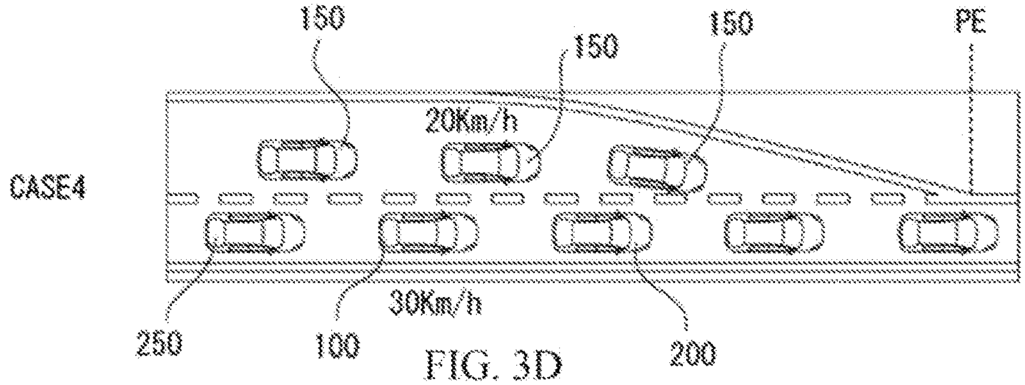

FIG. 2 illustrates a situation where the own vehicle 100 is traveling on a traveling lane 300 of a limited highway. The traveling lane 300 has a merging lane 301 that merges with the traveling lane 300, for example.

In FIG. 2, the own vehicle 100 is traveling following the preceding vehicle 200 with the ACC, and the merging vehicle 150 traveling on the merging lane 301 and in front of the own vehicle 100 is trying to enter the traveling lane 300.

FIG. 2 illustrates a situation where the own vehicle 100 is traveling on a traveling lane 300 of a limited highway. The traveling lane 300 has a merging lane 301 that merges with the traveling lane 300, for example. In FIG. 2, an overtaking lane 302 is also illustrated.

In the situation illustrated in FIG. 2, the own vehicle 100 is traveling following the preceding vehicle 200 with the ACC, and the merging vehicle 150 traveling on the merging lane 301 and in front of the own vehicle 100 is trying to enter the traveling lane 300.

Note that a range defined by broken lines each diagonally extending in a forward direction from the own vehicle 100 indicates a view range 400 of the stereo camera 18.

The merging lane 301 may have a start point PS and an end point PE. The merging lane 301 may thus correspond to a traveling path extending from the start point PS to the end point PE.

The start point PS may be a position where vehicles are allowed to merge into the traveling lane 300, which is a main lane. For example, the start point PS may be a position where the merging lane 301 starts merging or connecting with the traveling lane 300. The end point PE may be a position where the merging lane 301 is no longer present.

A distance between the own vehicle 100 and the merging vehicle 150 in a Z direction (traveling direction) is referred to as a "distance dZ", and a distance between the own vehicle 100 and the preceding vehicle 200 in the Z direction is referred to as a "distance dZP".

In this example, the merging vehicle 150 is traveling immediately before the own vehicle 100, and intending to enter a position between the own vehicle 100 and the preceding vehicle 200.

In such a case, according to the present embodiment, the own vehicle 100 sets the merging vehicle 150 as a target to follow by the ACC (hereinafter the setting may be also referred to as "ACC registration") to thereby achieve smooth merging, and natural acceleration and deceleration of the own vehicle 100.

The ACC at the time of merging may be performed considering the following points.

If all of the vehicles present on the merging lane 301 are set as targets to follow, the own vehicle 100 undergoes abrupt deceleration, which may be undesirable traveling as seen from a following vehicle 250. To address such a concern, the merging vehicle 150 allowed to enter the position before the own vehicle 100 may be selected by estimating an intention of the merging vehicle 150, and the selected merging vehicle 150 is set as the target to follow. This achieves smoother merging and prevents abrupt deceleration of the own vehicle 100 during traveling with the ACC as often as possible.

For this purpose, the ACC registration may be performed considering all or some of the following points.

- A vehicle closer to the end point PE is easier to be set as the target to follow based on the information acquired by the map locator 4.
- Time to contact (TTC), which is time to merging of the own vehicle 100 and the merging vehicle 150 at the merging point, is used to determine whether the ACC registration is to be performed.
- A selection condition based on an acceleration rate is used to determine whether the ACC registration is to be performed.
- A selection condition based on a position in a lateral direction is used to determine whether the ACC registration is to be performed.

Note that the lateral direction refers to a direction substantially perpendicular to the traveling direction of vehicles or a lane direction. The lateral direction thus corresponds to a vehicle width direction. Based on the points described above, the merging vehicle 150 traveling near the traveling lane 300 may be selected.

A timing of the ACC registration sometimes delays when the merging vehicle 150 traveling behind the own vehicle 100 overtakes the own vehicle 100 or when the merging vehicle 150 merges into a curved area with a small radius of curvature.

To address such an issue, the ACC registration may be performed also on the merging vehicle 150 whose side face is detected based on the image captured by the stereo camera 18. In other words, the ACC registration may be performed on the merging vehicle 150 before a rear face of the vehicle body is detected.

In addition, the ACC registration of the merging vehicle 150 is sometimes hindered when it is difficult to detect a lane line due to fading of the lane line or snow on the lane line, or when the merging vehicle travels on a curve with a small radius of curvature. To address such a concern, an effective lateral area may be enlarged or reduced with reference to the preceding vehicle 200.

Accordingly, it is possible to select the merging vehicle 150 to be subjected to the ACC registration only based on the information acquired by the map locator 4 and the image data acquired by the stereo camera 18 without using a millimeter-wave radar, light detection and ranging (LiDAR), or an inter-vehicular communication for detecting the merging vehicle.

FIGS. 3A to 3D illustrate respective Cases 1 to 4 according to the present example embodiment in which the merging vehicle 150 is subjected to the ACC registration or is not subjected to the ACC registration.

In Case 1, the own vehicle 100, the preceding vehicle 200, and the merging vehicle 150 each travel at a speed of 100 km/h. For example, the merging vehicle 150 traveling at a vehicle speed slightly different from that of the own vehicle 100 enters the view range of the stereo camera 18 while the preceding vehicle 200 is traveling. In this case, it may be estimated that the merging vehicle 150 is likely to enter the position immediately before the own vehicle 100, and therefore the merging vehicle 150 may be subjected to the ACC registration.

In Case 2, the own vehicle 100 and the preceding vehicle 200 each travel at a speed of 100 km/h, and the merging vehicle 150 travels at a speed of 60 km/h. In this case, a difference between the speed of the own vehicle 100 and the speed of the merging vehicle 150 is large, and thus it may be estimated that the own vehicle 100 will overtake the merging vehicle 150. Accordingly, it may be estimated that the merging vehicle 150 is unlikely to enter the position immediately before the own vehicle 100, and therefore the merging vehicle 150 may not be subjected to the ACC registration.

However, when the merging vehicle 150 is traveling in the vicinity of the end point PE, the merging vehicle 150 may be subjected to the ACC registration to achieve smooth merging.

In Case 3, the own vehicle 100 travels at a speed of 100 km/h, and the merging vehicle 150 travels at a speed of 80 km/h. Note that an acceleration rate of the merging vehicle 150 is high. In this case, although the difference between the speed of the own vehicle 100 and the speed of the merging vehicle 150 is large, it may be estimated that the merging vehicle 150 will accelerate to overtake the own vehicle 100. Accordingly, it may be estimated that the merging vehicle 150 is likely to enter the position immediately before the own vehicle 100, and therefore the merging vehicle 150 may be subjected to the ACC registration.

In Case 4, the own vehicle 100 travels at a speed of 30 km/h, and the merging vehicle 150 travels at a speed of 20 km/h. That is, it may be determined that traffic congestion has been generated. For example, when the own vehicle 100 travels at a speed lower than or equal to a predetermined speed while the preceding vehicle 200 is present, it may be determined that traffic congestion has been generated. When traffic congestion has been generated, a difference in speed or distance between the own vehicle 100 and the merging vehicle 150 is small. In such a case, the merging vehicle 150 close to the own vehicle 100 may be subjected to the ACC registration.

The cases described above are mere examples. According to the present example embodiment, the merging vehicle 150 to be subjected to the ACC registration may be selected. This achieves smoother merging, and natural traveling of the own vehicle 100 with the ACC.

3. Exemplary Procedure

A description is given of an exemplary procedure for the ACC registration of the merging vehicle 150 to be performed by the traveling control apparatus 2 based on the concept described above.

Figure 4:
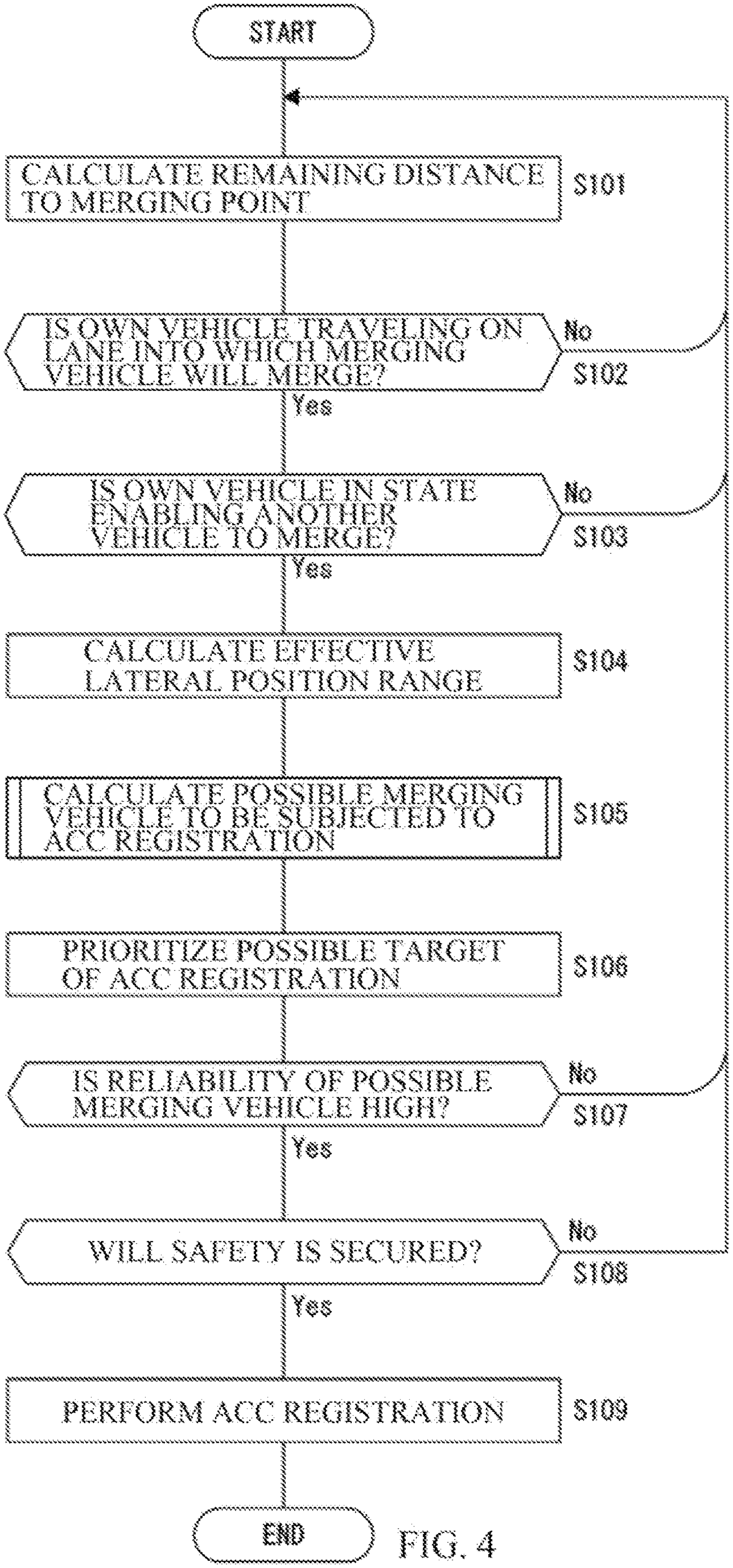
FIG. 4 is a flowchart of a process for determining a merging vehicle and setting the merging vehicle as the target to follow according to one example embodiment.
Figure 5:
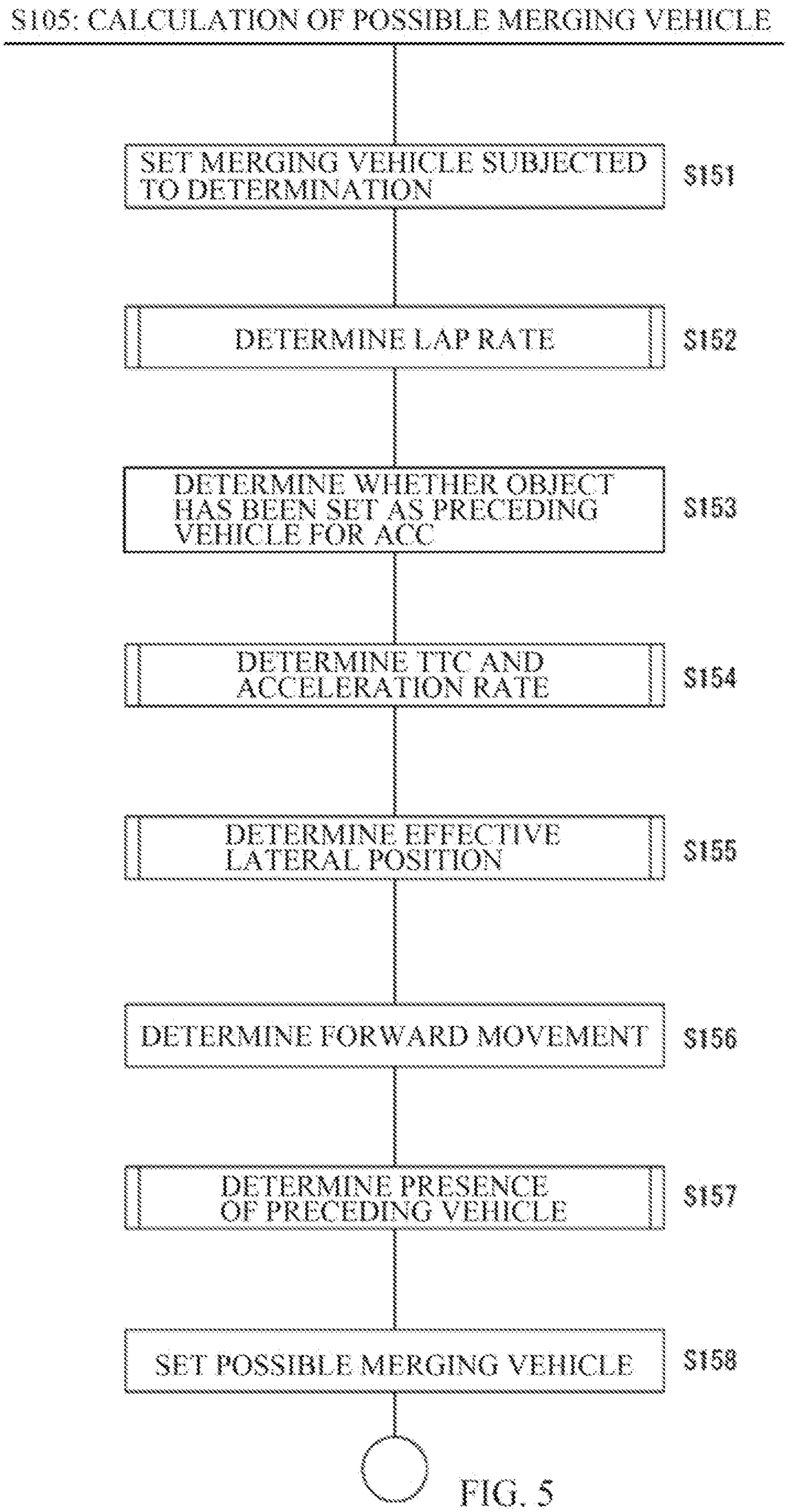
FIG. 5 is a flowchart of a process for determining a merging vehicle and setting the merging vehicle as the target to follow according to one example embodiment.

FIGS. 4 and 5 illustrate an exemplary procedure for a part of the ACC process to be performed by the traveling control apparatus 2 when the merging vehicle 150 is detected wile the own vehicle 100 is traveling on a limited highway. The procedure may be performed by the control target setting unit 2*a* of the traveling control apparatus 2. For example, the traveling control apparatus 2 may repeatedly execute the procedure illustrated in FIG. 4 while the ACC is executed.

In Step S101 of FIG. 4, the traveling control apparatus 2 may detect an area of the limited highway in which the merging lane 301 is present based on the information acquired by the map locator 4. When the own vehicle 100 reaches the area, the traveling control apparatus 2 may calculate a remaining distance to the merging point. For example, the remaining distance may be a distance to the merging point set in the vicinity of the end point PE.

In Step S102, the traveling control apparatus 2 may determine whether the own vehicle 100 is traveling on a lane into which the merging vehicle 150 will merge. i.e., the traveling lane 300 illustrated in FIG. 2. For example, when the own vehicle 100 is traveling on the overtaking lane 302, it may be estimated that the merging vehicle 150 will not enter the position before the own vehicle 100 (Step S102: No). The procedure may thus return to Step S101.

When the own vehicle 100 is traveling on the traveling lane 300 (Step S102: Yes), the procedure may proceed to Step S103. In Step S103, the traveling control apparatus 2 may determine whether the own vehicle 10 is in a state that enables another vehicle to merge, i.e., a state that enables the merging vehicle 150 to enter the position before the own vehicle 100. For example, when the own vehicle 100 is trying to make a lane change to the overtaking lane 302 by turning on a turn signal lamp, making a curve larger than expected, or making a large steering operation to avoid danger, it may be determined that the own vehicle 100 is not in the state that enables another vehicle to merge (Step S103: No). In this case, it may be estimated that the merging vehicle 150 will not merge into the position before the own vehicle 100, and the procedure may thus return to Step S101.

When the own vehicle 100 maintains to travel on the traveling lane 300, i.e., the lane that the merging vehicle 150 will merge into in the area including the merging lane 301 (Step S103: Yes), the procedure of the traveling control apparatus 2 may proceed to Step S104. In Step S104, the traveling control apparatus 2 may calculate an effective lateral position range extending in the lateral direction. The calculation may be based on merging information acquired from the map locator 4.

Figure 6:
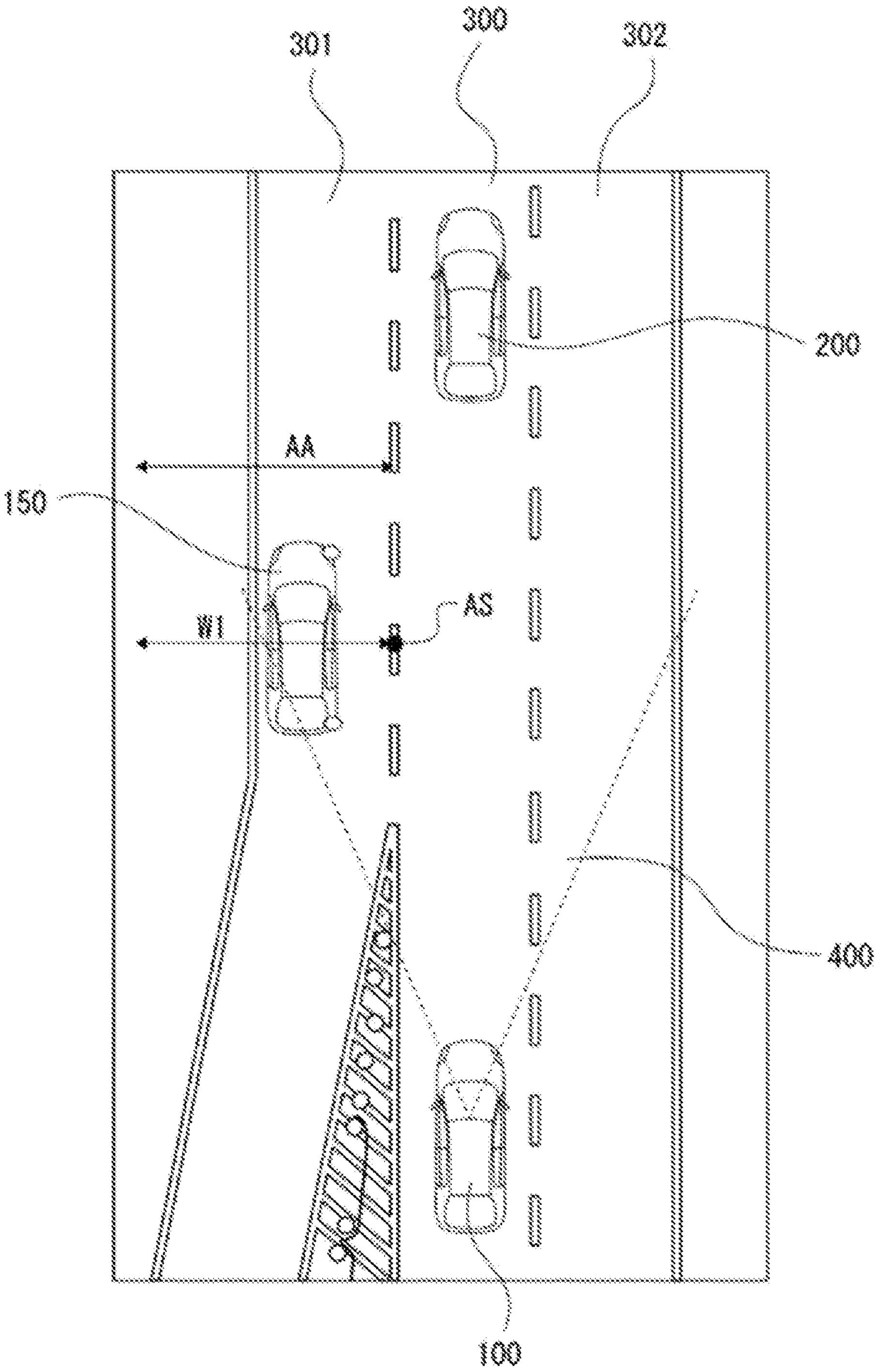
FIG. 6 is an explanatory diagram for describing an effective area extending in a lateral direction according to one example embodiment.

An exemplary setting of the effective lateral position range is illustrated in FIG. 6. The traveling control apparatus 2 may specify, an area start point AS of the effective lateral position range extending in the lateral direction with reference to the traveling lane 300 on which the own vehicle 100 is traveling, for example. In one example, the area start point AS may be set at on a lane line between the traveling lane 300 and the merging lane 301.

If the lane line is not clearly detected from the image captured by the stereo camera 18 due to fading of the lane line or a weather condition, the area start point AS may be set at a left-end position of the preceding vehicle 200 or a position shifted by a predetermined distance from the left-end position of the preceding vehicle 200.

The traveling control apparatus 2 may set an area with an area width W1 extending from the area start point AS toward the merging lane 301 and as an effective area AA.

The effective area AA may be calculated to determine the merging vehicle 150 to be subjected to the ACC registration. For example, the effective area AA is calculated to prevent erroneous recognition of a structure other than a vehicle as the merging vehicle 150 or exclude a vehicle traveling or stopping near a road shoulder of the merging lane 301, for example.

Accordingly, the effective area AA may be set as an area on the merging lane 301 close to the traveling lane 300 to some extent to detect a vehicle estimated to have an intention to merge. The traveling control apparatus 2 may set the merging vehicle 150 present within the effective area AA as a possible target to be subjected to the ACC registration.

The area width W1 may be set to an appropriate value between 5 meters and 7 meters both inclusive. Note that the area width W1 may be changed according to the following conditions, assuming various situations.

A first condition may be satisfied when one or more of the following terms are satisfied.

An object detected on the merging lane 301 through the recognition based on the image captured by the stereo camera 18 or through the inter-vehicular communication is recognized as a vehicle.

An object detected while the own vehicle 100 is making a curve along the traveling lane 300 is recognizable as the merging vehicle 150 based on an inclination of the object with respect to the traveling direction.

A second condition may be satisfied when one or more of the following terms are satisfied.

An object detected is the merging vehicle 150 already subjected to the ACC registration.

The merging lane 301 is a merging path extending from an inner side of a curve of the traveling lane 300.

An object is recognizable as the merging vehicle 150 based on an inclination of the object in the traveling direction with respect to the traveling lane 300 which is a straight lane.

The area width W1 may be set according to the first and second conditions as follows.

When both of the first condition and the second condition are satisfied, the area width W1 is set at d1 meters.

When the first condition is satisfied and the second condition is not satisfied, the area width W1 is set at d2 meters.

When the first condition is not satisfied and the second condition is satisfied, the area width W1 is set at d3 meters.

When neither the first condition nor the second condition is satisfied, the area width W1 is set at d4 meters.

Note that the equation, $d1>d2\geq d3>d4$ is satisfied.

By setting the area width W1 as described above, it is possible to set the effective area AA at an appropriate range for determining an ACC registration target depending on merging situations.

Thereafter, in Step S105 of FIG. 4, the traveling control apparatus 2 may calculate a possible merging vehicle to be subjected to the ACC registration. FIG. 5 illustrates an exemplary process at Step S105 in detail.

In Step S151, the traveling control apparatus 2 may set the merging vehicle 150 which is to be subjected to a determination. That is, the traveling control apparatus 2 may set a vehicle which is to be subjected to a determination as to whether the merging vehicle 150 detected on the merging lane 301 is recognizable as the ACC registration target. For example, the traveling control apparatus 2 may set one or more vehicles detected from the image captured by the stereo camera 18 as the merging vehicle(s) 150 to be subjected to the determination.

Figure 7:
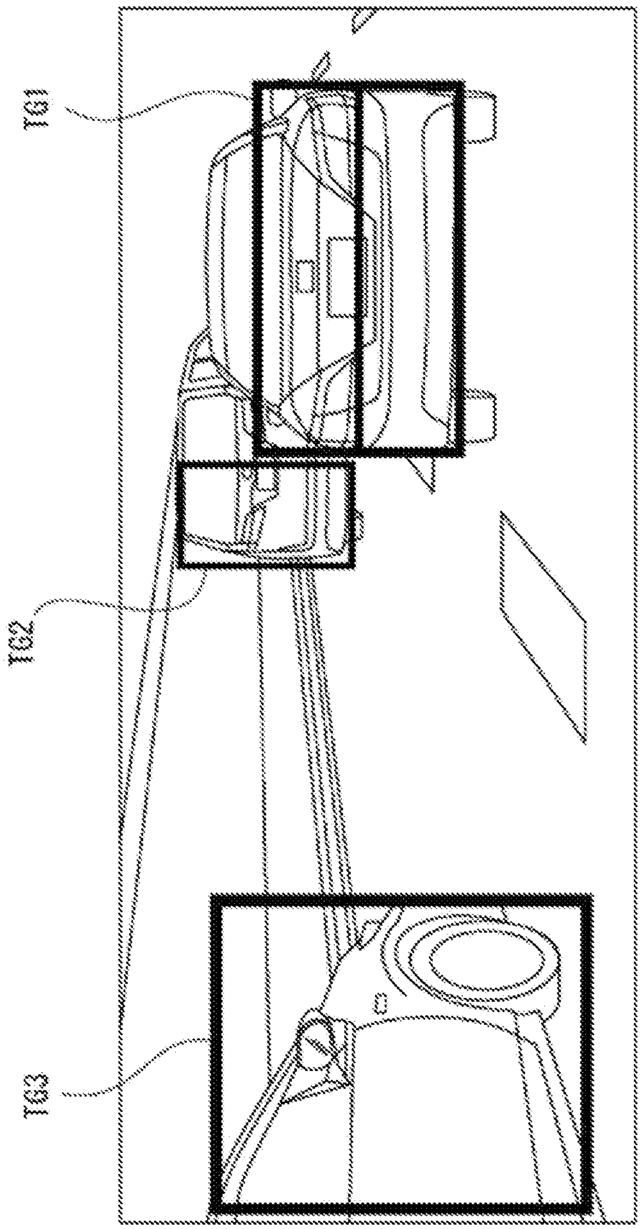
FIG. 7 is an explanatory diagram for describing vehicle recognition according to one example embodiment.

For example, the traveling control apparatus 2 may recognize a vehicle whose side face is detected as the possible vehicle to be subjected to the determination as well as a vehicle whose rear face is detected FIG. 7 illustrates an example of the image captured by the stereo camera 18. In this image, objects recognizable as vehicles are detected as indicated by frames TG1, TG2, and TG3. The frame TG3 indicates a vehicle whose side face is detected. The traveling control apparatus 2 may be able to recognize the vehicle indicated by the frame TG3 also as the vehicle to be subjected to the determination. The frame TG1 indicates a vehicle already recognized as the preceding vehicle 200 that is a target to follow. In this example, the vehicles traveling on the merging lane 301 that are indicated by the frames TG2 and TG3 may be set as targets to be subjected to the determination regarding the ACC registration.

In Step S151, the merging vehicle 150 present on the merging lane 301 may be set as the target to be subjected to the determination. However, it is not always possible to accurately determine whether an object present on the merging lane 301 is a vehicle based on the image captured by the stereo camera 18. A structure other than a vehicle may possibly be erroneously recognized as a side face of a vehicle body and may possibly be determined as the target to be subjected to the determination.

Although not illustrated in FIGS. 4 and 5, when no object recognizable as a vehicle is detected on the merging lane 301, the procedure may return to Step S101 as no target to be subjected to the determination is present.

When one or more objects are set as the targets to be subjected to the determination, the traveling control apparatus 2 may determine whether each of the targets is the merging vehicle 150 having a factor to be determined as the ACC registration target in Step S152 and the subsequent steps of FIG. 5.

Figure 8:
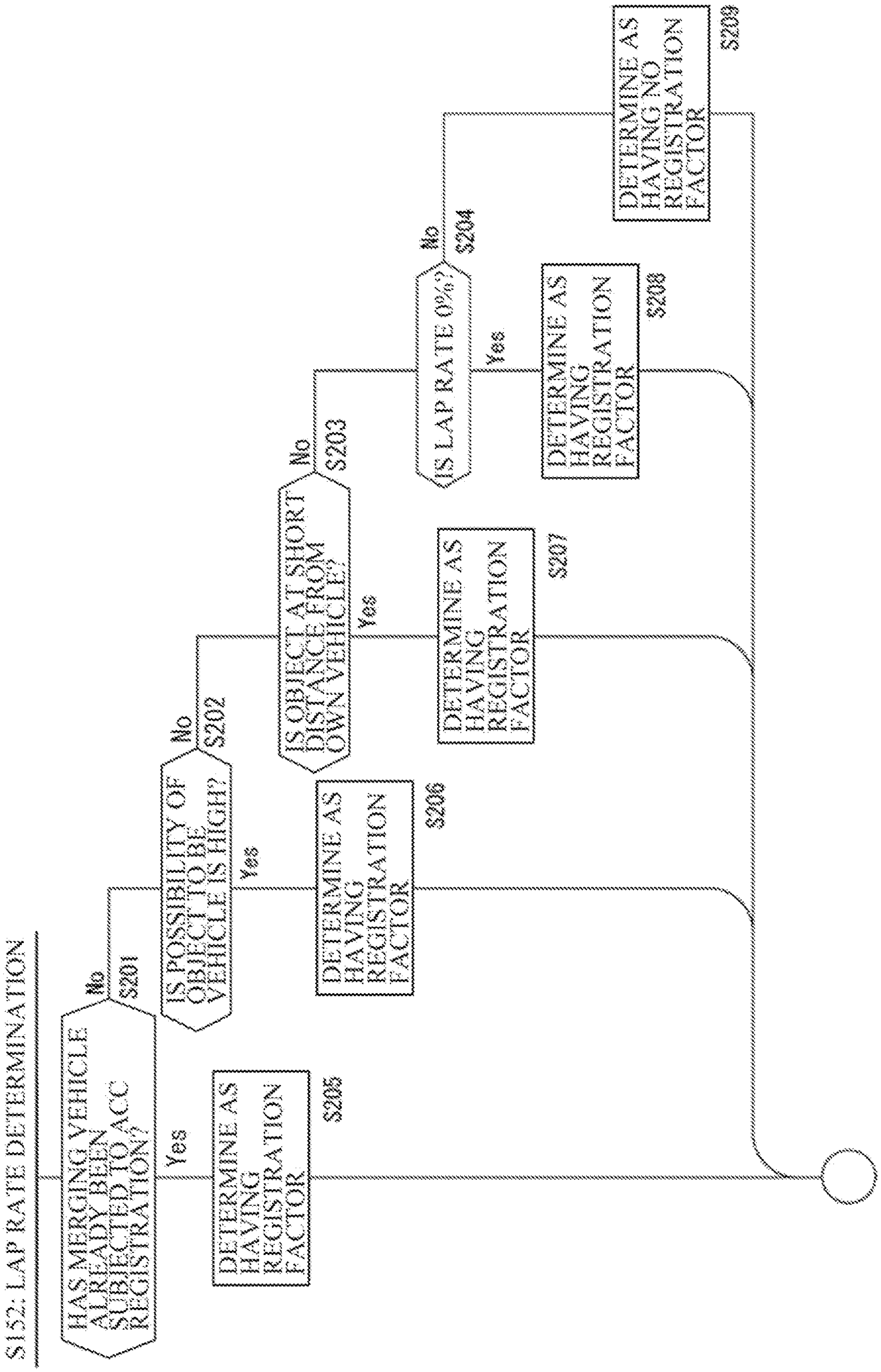
FIG. 8 is a flowchart of a lap rate determination according to one example embodiment.

First, in Step S152, the traveling control apparatus 2 may perform a lap determination on each of the targets. The lap determination may be a process for determining whether a vehicle traveling on a lane other than the traveling path of the own vehicle 100 (i.e., a lane other than the traveling lane 300 illustrated in FIG. 2) has the factor to be determined as the target to be subjected to the determination regarding the ACC registration (hereinafter simply referred to as an ACC registration factor). FIG. 8 illustrates an example of the lap determination.

In Step S201, the traveling control apparatus 2 may determine whether the vehicle has already been subjected to the ACC registration in the process for a previous frame or the like. If the vehicle has been subjected to the ACC registration (Step S201: Yes), the vehicle may be determined to have the ACC registration factor in Step S205, and the ACC registration of the vehicle may be continuously maintained.

In each of the following processes, the traveling control apparatus 2 may determine that the merging vehicle 150 has the ACC registration factor when it is determined that the merging vehicle 150 has a factor appropriate to the ACC registration, whereas the traveling control apparatus 2 may determine that the merging vehicle 150 has no ACC registration factor when it is determined that the merging vehicle 150 has no factor appropriate to the ACC registration. For example, the merging vehicle 150 having many ACC registration factors may be preferentially subjected to the ACC registration. Thus, in practice, when the merging vehicle 150 has the ACC registration factor, a determination counter may be incremented, for example. When the vehicle has no ACC registration factor, the determination counter may be decremented or not incremented. Alternatively, when the merging vehicle 150 has no ACC registration factor, a registration inappropriateness counter may be incremented.

In Steps S152 to S157, a determination may be made as to whether the merging vehicle 150 set as the target subjected to the determination is appropriate to the ACC registration from various viewpoints, and whether the determination target has the ACC registration factor. As the result of the determination, it may be determined whether the determination target is practically subjected to the ACC registration. Various examples of the practical process may be conceivable.

When it is determined in Step S201 of FIG. 8 that the vehicle has not been subjected to the ACC registration (Step S201: No), the traveling control apparatus 2 may determine in Step S202 whether a probability of the object to be a vehicle is high. For example, the traveling control apparatus 2 may determine whether the object has been detected as a vehicle by some method. In one example, it may be determined that the probability of the object to be a vehicle is high when the object is determined to be likely to be a vehicle by a three-dimensional determination or when the object is determined to be a vehicle through the inter-vehicular communication. When it is determined that the probability of the object to be a vehicle is high (Step S202: Yes), the traveling control apparatus 2 may determine in Step S206 that the vehicle has the registration factor.

When it is determined that the probability of the object to be a vehicle is low (Step S202: No), the traveling control apparatus 2 may determine in Step S203 whether the object is at a short distance from the own vehicle 100. For example, the traveling control apparatus 2 may determine whether the distance dZ in the Z direction (traveling direction) is shorter than or equal to a predetermined distance. The predetermined distance may be 10 meters, for example. Another condition that the inclination of a side face of the object with respect to the traveling direction is 10 degrees or less may be added.

If these conditions are satisfied (Step S203: Yes), the traveling control apparatus 2 may determine in Step S207 that the object has the registration factor.

If the conditions are not satisfied (Step S203: No), the traveling control apparatus 2 may determine in Step S204 whether a lap rate is 0%. The lap rate may refer to a rate of overlapping of the object with the own vehicle 100 in the width direction of the own vehicle 100. When it is determined that the lap rate of the object detectable from the image captured by the stereo camera 18 is 0% (Step S204: Yes), it may be determined that the object is likely to be the merging vehicle 150 present on the merging lane 301 rather than the preceding vehicle 200. In this case, the traveling control apparatus 2 may determine in Step S208 that the object has the registration factor. When it is determined that the lap rate is not 0% (Step S204: No), the traveling control apparatus 2 may determine in Step S209 that the object has no registration factor.

Through the process for determining the lap rate described above, it may be determined whether an object that is not present on the traveling lane 300 of the own vehicle 100, i.e., an object present on the merging lane 301 has the registration factor. However, as an exception, even when the lap rate is not 0%, the merging vehicle 150 already subjected to the ACC registration or the vehicle whose side face is detected at a short distance from the own vehicle 100 are not excluded from possible ACC registration targets.

Thereafter, the traveling control apparatus 2 may determine in Step S153 of FIG. 5 whether the object has been set as the preceding vehicle 200 for the ACC in the processing of a current or previous frame.

If the object has been set as the preceding vehicle 200 for the ACC, the traveling control apparatus 2 may determine that the object has no registration factor.

If the object has not been set as the preceding vehicle 200 for the ACC, the traveling control apparatus 2 may determine that the object has the registration factor.

Figure 9:
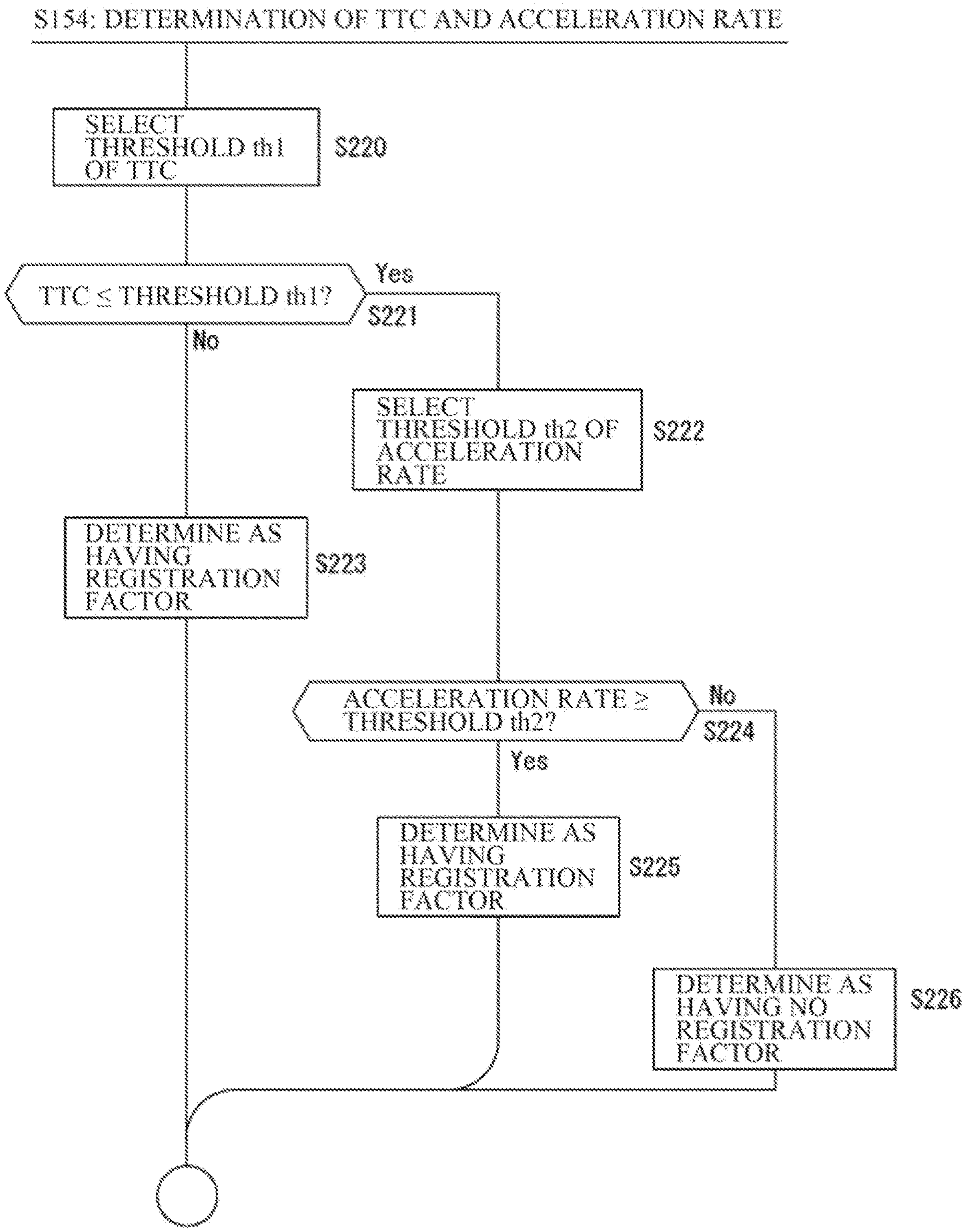
FIG. 9 is a flowchart of a process for determining time to contact and an acceleration rate according to one example embodiment.

In Step S154, the traveling control apparatus 2 may perform a process for determining TTC and an acceleration rate. FIG. 9 illustrates an example of the process.

The TTC determined in Step S154 may be TTC calculated based on the distance dZ from the own vehicle 100 to the object likely to be the merging vehicle 150 (refer to FIG. 2). When the TTC is too short, the object may not be set as the ACC registration target. One reason for this is that, when the TTC is too short and the distance to the own vehicle 100 is short accordingly, it is estimated that the merging vehicle 150 will normally refrain from forcibly merging into the position before the own vehicle.

In Step S220 of FIG. 9, the traveling control apparatus 2 may select a threshold th1 for the determination of TTC. The threshold th1 may be selected based on the speed of the own vehicle 100 or the distance to the object. For example, when the distance dZ to the object is less than 15 meters, the threshold th1 may be selected as follows.

When the speed of the own vehicle is higher than or equal to 0 km/h and lower than 30 km/h, the threshold th1 is set at t1 seconds.

When the speed of the own vehicle is higher than or equal to 30 km/h and lower than 60 km/h, the threshold th1 is set at t2 seconds.

When the speed of the own vehicle is higher than or equal to 60 km/h and lower than 100 km/h, the threshold th1 is set at t3 seconds.

When the speed of the own vehicle is higher than or equal to 100 km/h and lower than 135 km/h, the threshold th1 is set at t4 seconds.

Note that the equation, $t1<t2<t3<t4$ is satisfied.

When the distance dZ to the object is greater than or equal to 15 meters, the threshold th1 may be set at 1.8 seconds regardless of the speed of the own vehicle, for example. As the distance dZ is sufficiently large, the threshold th1 set at the value makes the ACC registration easily performed.

In Step S221, the traveling control apparatus 2 may calculate TTC with respect to the object and determine whether the TTC is less than or equal to the threshold th1.

When the TTC is not less than or equal to the threshold th1, i.e., when the TTC is not too short (Step S221: No), the process may proceed to Step S223 in which the traveling control apparatus 2 determines that the object has the registration factor.

In contrast, when the TTC is less than or equal to the threshold th1, i.e., when the TTC is too short (Step S221: Yes), the process may proceed to Step S222 in which the traveling control apparatus 2 selects a threshold th2 for the determination of an acceleration rate. Even when the TTC is short, if the acceleration rate of the object or the merging vehicle 150 is high, it may be estimated that the merging vehicle 150 has an intention to merge into the position before the own vehicle 100.

The threshold th2 for the acceleration rate may be selected as follows based on a relative speed between the own vehicle 100 and the object, for example. The relative speed may be calculated by the expression, (the speed of the object likely to be the merging vehicle 150)−(the speed of the own vehicle). Note that, in the following, "S^2" indicates the square of s (second).

When the relative speed is greater than or equal to −10 km/h and less than 10 km/It the threshold th2 is set at a1 (mm/s^2).

When the relative speed is greater than or equal to −20 km/h and less than −10 km/h, the threshold th2 is set at a2 (mm/s^2).

When the relative speed is greater than or equal to −30 km/h and less than −20 km/h, the threshold th2 is set at a3 (mm/s^2).

When the relative speed is greater than or equal to −40 km/h and less than −30 km/h, the threshold th2 is set at a4 (mm/s^2).

Note that the equation, $a1<a2<a3<a4$ is satisfied.

As in the example described above, the threshold th2 may be set at a larger acceleration rate as the speed of the merging vehicle 150 is lower than the speed of the own vehicle 100.

In Step S224, the traveling control apparatus 2 may calculate an acceleration rate of the object and determine whether the acceleration rate is greater than or equal to the threshold th2.

When the acceleration rate is greater than or equal to the threshold th2, i.e., when it is estimated based on the acceleration rate of the merging vehicle 150 that the merging vehicle 150 will overtake the own vehicle 100 and merge into the position before the own vehicle 100 (Step S224: Yes), the process may proceed to Step S225 in which the traveling control apparatus 2 determines that the merging vehicle 150 has the registration factor.

Otherwise (Step S224: No), the process may proceed to Step S226 in which the traveling control apparatus 2 determines that the merging vehicle 150 has no registration factor.

Although not described above, when the relative speed is greater than or equal to 10 km/h, for example, the vehicle speed of the merging vehicle 150 is sufficiently higher than the vehicle speed of the own vehicle 100. In this case, it may be estimated that the merging vehicle 150 will merge into a position further ahead of the position immediately before the own vehicle 100, i.e., a position before the preceding vehicle 200. Accordingly, the traveling control apparatus 2 may determine that the merging vehicle 150 has no registration factor.

Figure 10:
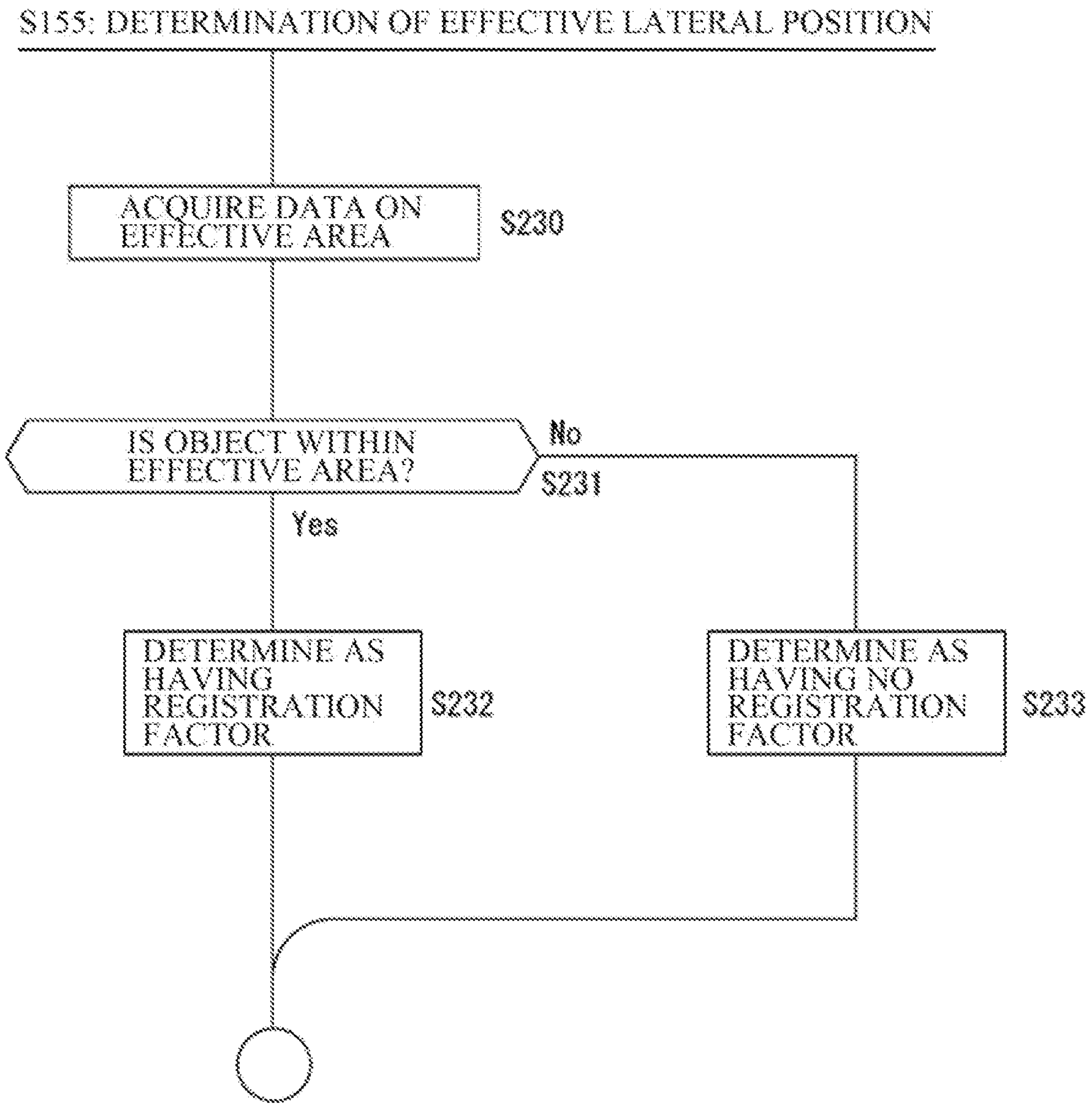
FIG. 10 is a flowchart of a process for determining an effective lateral position according to one example embodiment.

Thereafter, the traveling control apparatus 2 may perform a process for determining an effective lateral position in Step S155 of FIG. 5. FIG. 10 illustrates an example of the process.

In Step S230, the traveling control apparatus 2 may acquire the data on the effective area AA calculated in Step S104 of FIG. 4 described above.

In Step S231, the traveling control apparatus 2 may determine whether a lateral position of the object is located within the effective area AA. When the object is present within the effective area AA (Step S231: Yes), the traveling control apparatus 2 may determine in Step S232 that the object has the registration factor.

In contrast, when the object is not present within the effective area AA, it may be estimated that the object is likely to be a vehicle having no intention to merge or a structure other than a vehicle. Accordingly, the traveling control apparatus 2 may determine in Step S233 that the object has no registration factor.

Thereafter, the traveling control apparatus 2 may perform a process for determining a forward movement in Step S156 of FIG. 5.

In this process, the traveling control apparatus 2 may determine whether the object is moving forward. That is, the traveling control apparatus 2 may determine whether the object is the merging vehicle 150 which is traveling. Even if the object is a vehicle, the object may be excluded from the ACC registration target when the vehicle is stopped. For this reason, the speed of the object may be determined.

When it is determined that the object is moving forward, the traveling control apparatus 2 may determine that the object has the registration factor. In contrast, when it is determined that the object is not moving forward, the traveling control apparatus 2 may determine that the object has no registration factor.

Figure 11:
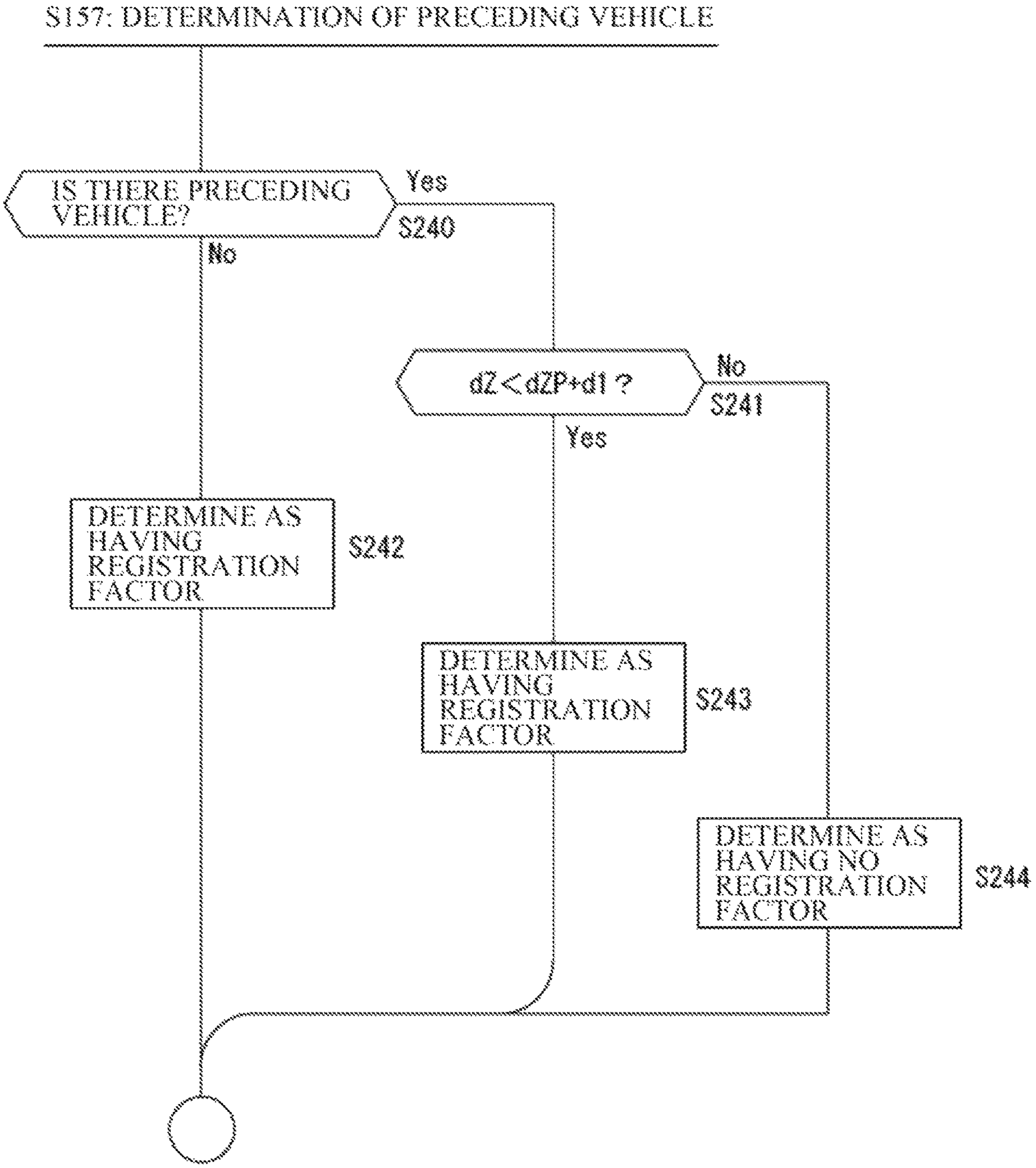
FIG. 11 is a flowchart of a process for determining a preceding vehicle according to one example embodiment.

In Step S157, the traveling control apparatus 2 may perform a process for determining the presence of a preceding vehicle. FIG. 11 illustrates an example of the process.

In Step S240, the traveling control apparatus 2 may determine whether the preceding vehicle 200 is present. When the preceding vehicle 200 is not present (Step S240: No), the traveling control apparatus 2 may determine in Step S242 that the object has the registration factor. When the preceding vehicle 200 is not present, it may be estimated that the merging vehicle 150 will merge into the position before the own vehicle 100. Thus, the merging vehicle 150 may be subjected to the ACC registration to achieve smooth merging.

In contrast, when the preceding vehicle 200 is present (Step S240: Yes), the traveling control apparatus 2 may compare the distance dZ between the own vehicle 100 and the object with the sum of the distance dZP between the own vehicle 100 and the preceding vehicle 200 (refer to FIG. 2) and a predetermined distance d1 in Step S241. The predetermined distance d1 may be 10 meters, for example.

When the distance dZ is less than the sum of the distance dZP and the predetermined distance d1 (i.e., distance dZ<(distance dZP+predetermined distance d1 is satisfied) (Step S241: Yes), it is estimated that the object or the merging vehicle 150 will merge into a position between the own vehicle 100 and the preceding vehicle 200. Accordingly, the traveling control apparatus 2 may determine in Step S243 that the object has the registration factor.

In contrast, when the distance dZ is not less than the sum of the distance dZP and the predetermined distance d1 (i.e., distance dZ<(distance dZP+predetermined distance d1 is not satisfied) (Step S241: No), it may be estimated that the object or the merging vehicle 150 will merge into a position ahead of the preceding vehicle 200. Accordingly, the traveling control apparatus 2 may determine in Step S244 that the object has no registration factor.

As described above, the traveling control apparatus 2 may determine whether the object has the registration factor according to the determination conditions in Steps S152 to S157 illustrated in FIG. 5. However, the determination is not limited to the example described above, and may made according to other conditions. In addition, all of Steps S152 to S157 are not necessarily performed.

In Step S158, one or more objects may be set as possible merging vehicles 150 to be subjected to the ACC registration based on some or all of the determinations in Steps S152 to S157.

For example, an object that has been determined to have the registration factor the number of times (count value) greater than a predetermined value may be determined as a possible target of the ACC registration. Optionally, the number of times the determination that the object has no registration factor is made or the types of determination terms may be used as one of the criteria of the determination as to whether the object is a possible target of the ACC registration.

After the process illustrated in FIG. 5 is performed as Step S104 of FIG. 4 as described above, the traveling control apparatus 2 may prioritize the possible target of the ACC registration in Step S106 of FIG. 4.

In this case, the merging vehicles 150 set as the possible targets may be prioritized according to their position in the traveling direction (Z direction), for example. For instance, as the distance dZ between the merging vehicle 150 and the own vehicle 100 becomes shorter, the priority of the merging vehicle 150 may become higher. In addition, the merging vehicle 150 present near the end point PE may be highly prioritized.

The prioritization may be performed by increasing the count value indicating the number of times the object is determined as having the registration factor or by weighting.

In Step S107, the traveling control apparatus 2 may assess reliability of the merging vehicle 150 set as the possible target of the ACC registration. For example, the reliability may be assessed according to the type of the condition for the determination regarding the registration factor, the number of times of the determination, and certainty of the possible target to be a vehicle. When it is assessed that the reliability is at a sufficient level, the merging vehicle 150 may be preferentially subjected to the ACC registration.

In a case where the process in Step S105 of FIG. 4 is repeatedly executed at a timing of each frame of the image captured by the stereo camera 18, it may be assessed that the reliability of the merging vehicle 150 is high when the determination as having the registration factor is maintained in a predetermined frame period.

When the reliability of each of the merging vehicles 150 set as the possible targets for the ACC registration is not high (Step S107: No), the traveling control apparatus 2 may return the process to Step S101. When the reliability of one or more of the merging vehicles 150 set as the possible targets for the ACC registration is high (Step S107: Yes), the traveling control apparatus 2 may cause the process to proceed to Step S108.

In Step S108, the traveling control apparatus 2 may determine whether safety of the object determined to have high reliability will be ensured after being subjected to the ACC registration. For example, the traveling control apparatus 2 may assess a possibility of an occurrence of danger such as abrupt braking due to the ACC registration. When there is the possibility of the occurrence of danger due to the ACC registration (Step S108: No), the traveling control apparatus 2 may refrain from performing the ACC registration of the object.

When there is no possibility of the occurrence of danger (Step S108. Yes), the traveling control apparatus 2 may perform the ACC registration of the object (the merging vehicle 150) in Step S109.

The following control unit 2*b* of the traveling control apparatus 2 recognizes the merging vehicle 150 subjected to the ACC registration as described above as a vehicle that will merge into a position before the own vehicle 100, and performs the control to cause the own vehicle 100 to travel following the merging vehicle 150. This achieves smooth merging and prevents the own vehicle 100 from performing unnatural traveling.

4. Effects of Example Embodiments and Modification Example

According to the foregoing example embodiment, the following effects are obtained.

The traveling control apparatus 2 of the foregoing example embodiment includes a computer device that performs the ACC that causes the own vehicle 100 to travel at a set constant vehicle speed or to travel following the preceding vehicle 200. The computer device of the traveling control apparatus 2 includes the control target setting unit 2*a*. The control target setting unit 2*a* performs the determination of conformity between a vehicle detected on the merging lane 301 merging with the traveling lane of the own vehicle 100 and the merging vehicle 150 intending to enter the position immediately before the own vehicle 100 as illustrated in FIGS. 4 and 5, for example. Based on the result of the determination, the control target setting unit 2*a* sets the vehicle as the merging vehicle to follow. The computer device of the traveling control apparatus 2 further includes the following control unit 2*b* that performs ACC process to cause the own vehicle 100 to travel following the merging vehicle 150 set by the control target setting unit 2*a* as the target to follow.

In this way, among the merging vehicles 150 traveling on the merging lane 301, the merging vehicle 150 likely to enter the position immediately before the own vehicle 100 is set as the vehicle to follow. That is, the vehicle to follow is set before the vehicle enters the traveling lane 300 of the own vehicle 100. Accordingly, it is possible to perform speed control of the own vehicle 100 with setting the merging vehicle 150 as the target of the ACC before the merging vehicle 150 enters the traveling lane of the own vehicle 100. This achieves smooth traveling without cancelling the ACC.

Since the determination of the conformity between the object and the vehicle intending to enter the position immediately before the own vehicle 100 is performed and the object is set as the merging vehicle 150 to follow based on the result of the determination as illustrated in FIGS. 4 and 5, unconditional setting of all of the vehicles on the merging lane 301 as the targets to follow is not performed. Among the vehicles present on the merging lane 301, the vehicle estimated to be subjected to the ACC registration, i.e., the vehicle likely to enter the position before the vehicle 100 is appropriately set as the target to follow. This prevents an increase in the number of vehicles unconditionally subjected to the ACC registration and an increase in large acceleration and deceleration of the own vehicle 100.

Accordingly, it is possible to improve the safety of traveling with the ACC and increase the operation rate of the ACC.

According to the foregoing example embodiment, the merging vehicle 150 to be subjected to the ACC registration may be detected without using a millimeter-wave radar, LiDAR, and an inter-vehicular communication, for example. That is, the merging vehicle 150 to be subjected to the ACC registration may be selected only based on the information acquired by the map locator 4 and the information acquired by the stereo camera 18. The foregoing example embodiment is thus easy to implement.

According to the foregoing example embodiment, the traveling control apparatus 2 performs a process for comparing the TTC (time to contact) between the own vehicle 100 and the vehicle subjected to the determination with the threshold th1 in the determination of the conformity performed by the control target setting unit 2*a* (refer to FIG. 9). The threshold th1 may be selected based on the speed of the own vehicle or the measured distance between the own vehicle and the target subjected to the determination.

When the TTC with respect to the vehicle traveling on the merging lane 301 and subjected to the determination is too short, it is not easy for the vehicle to enter the position immediately before the own vehicle 100. Thus, it is estimated that the vehicle is unlikely to enter the position immediately before the own vehicle 100. In other words, when the TTC is greater than the threshold th1, the object is likely to be the merging vehicle intending to merge into the position immediately before the own vehicle 100. Such TTC which represents the easiness of merging may vary depending on the speed of the own vehicle 100 or the distance DZ in the traveling direction. Accordingly, the threshold th1 may be selected based on the distance dZ between the own vehicle 100 and the vehicle subjected to the determination or the speed of the own vehicle 100. When the TTC is greater than the threshold th1, the probability of the vehicle subjected to the determination to be the merging vehicle 150 intending to enter the position immediately before the own vehicle 100 is high. Therefore, by determining the TTC and the threshold th1, it is possible to improve the accuracy in determining the conformity with the merging vehicle 150 to be subjected to the ACC registration.

According to the foregoing example embodiment, the traveling control apparatus 2 performs the process for comparing the acceleration rate of the vehicle subjected to the determination with the threshold th2 in the determination of the conformity performed by the control target setting unit 2*a* (refer to FIG. 9). The threshold th2 may be selected based on the relative speed between the own vehicle 100 and the vehicle subjected to the determination.

When the acceleration rate of the vehicle traveling on the merging lane 301 and subjected to the determination is large, the vehicle is likely to merge into the traveling lane 300 on which the own vehicle 100 is traveling. For example, when the TTC is short and the vehicle traveling on the merging lane 301 accelerates to some extent, it may be determined that the vehicle is increasing the distance dZ with respect to the own vehicle 100 in the traveling direction. That is, even if the TTC is shorter than the threshold th1, if the acceleration rate of the vehicle is greater than the threshold th2, the vehicle is likely to be the merging vehicle 150 intending to enter the position immediately before the own vehicle 100. Accordingly, such a determination makes it possible to improve the accuracy in determining the conformity with the merging vehicle 150 to be subjected to the ACC registration.

In addition, since the degree of the acceleration rate for merging varies depending on the relative speed, the threshold th2 may be selected based on the relative speed. This improves the accuracy of the determination.

According to the foregoing example embodiment, in the determination of the conformity performed by the control target setting unit 2*a*, the traveling control apparatus 2 may set the effective area AA extending from the own vehicle in the lateral direction according to the conditions, and may detect whether the vehicle subjected to the determination is present within the effective area AA (refer to Step S104 of FIG. 4, Step S155 of FIG. 5, and FIG. 10).

It is not appropriate to determine all the vehicles detected on the merging lane 301 as seen from the traveling lane 300 of the own vehicle 100 to be the merging vehicles 150 because a vehicle stopping in a location laterally distant from the traveling lane 300 or an object other than a vehicle are erroneously detected as the vehicle traveling on the merging lane 301, in some cases. To address this concern, the determination as to whether the vehicle is within the effective area AA may be performed as one of the conditions for determining the merging vehicle 150. This improves the accuracy of the determination.

Further, the range of the effective area AA may be changed according to the conditions such as a road curve, the state of vehicle recognition, and the presence or absence of the preceding vehicle 200. Such an effective area AA serves as one of the appropriate criterion for determining whether the merging vehicle 150 will merge into the position immediately before the own vehicle 100.

According to the foregoing example embodiment, the control target setting unit 2*a* of the traveling control apparatus 2 may set a vehicle which is traveling on the merging lane 301 and whose side face is detected as the target to be subjected to the determination of the conformity.

The rear face of the vehicle traveling on the merging lane 301 is not able to be detected unless the distance dZ of a certain degree is maintained in the traveling direction as seen from the own vehicle 100. In the normal following control, the rear face of the preceding vehicle 200 is detected. However, detecting the rear face of the merging vehicle 150 to determine the target of the ACC registration may possibly delay the ACC registration. Accordingly, a vehicle whose side face is detected may also be set as the vehicle to be subjected to the determination process. This makes it possible to set a vehicle traveling on the merging lane 301 while maintaining a relatively small distance Z from the own vehicle 100 also as the merging vehicle 150. It is therefore possible to set the merging vehicle 150 as the target of the ACC registration at an appropriate timing.

Note that the foregoing example embodiments are mere examples of the disclosure, and embodiments of the disclosure are not limited to those described above, and various modifications are conceivable. As used herein, the term "contact" may be used interchangeably with the term "collision".

Further, programs that cause the computer device to execute the processing as illustrated in FIGS. 4, 5, 8, 9, 10, and 11 may be stored in a storage medium such as a non-volatile memory in the traveling control apparatus 2 or a non-volatile memory in the vehicle control system 1. Alternatively, the programs may be stored in a portable storage medium or may be downloaded from a server apparatus via network communication.

One or both of the control target setting unit 2*a* and the following control unit 2*b* in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control target setting unit 2*a* and the following control unit 2*b*. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the control target setting unit 2*a* and the following control unit 2*b* in FIG. 1.

The invention claimed is:

1. A traveling control apparatus comprising a computer device configured to perform control that causes a first vehicle to travel at a set constant vehicle speed or to travel following a second vehicle traveling in front of the first vehicle, the computer device comprising a control target setting unit configured to:

perform a conformity determination as to whether a third vehicle detected on a merging lane that merges with a traveling lane on which the first vehicle travels is a vehicle intending to enter a position immediately before the first vehicle; and set, based on a result of the conformity determination, the third vehicle as a merging vehicle serving as a target to follow; and a following control unit configured to control the first vehicle to travel following the merging vehicle set by the control target setting unit as the target to follow, wherein the control target setting unit is further configured to:

acquire, from a map locator, information indicating the merging lane; and recognize, based on the information, a merging area on the traveling lane where the merging lane merges into the traveling lane, the merging area being defined based on a start point of the merging lane and an end point of the merging lane;

perform the conformity determination when the first vehicle is traveling in the merging area; and in performing the conformity determination, (i) compare time to contact between the first vehicle and the third vehicle subjected to the conformity determination to a first threshold;

(ii) in response to determining that the time to contact is less than or equal to the first threshold, select a second threshold for an acceleration rate of the third vehicle based on a relative speed between the first vehicle and the third vehicle, and compare the acceleration rate of the third vehicle to the second threshold; and (iii) refrain from setting the third vehicle as the target to follow when the acceleration rate of the third vehicle is less than the second threshold.

2. The traveling control apparatus according to claim 1, wherein the first threshold is selected based on a speed of the first vehicle, or a measured distance between the first vehicle and the third vehicle subjected to the conformity determination.

3. The traveling control apparatus according to claim 2, wherein, in performing the conformity determination, the control target setting unit is configured to set an effective area extending from the first vehicle in a lateral direction according to a condition, and detect whether the third vehicle subjected to the conformity determination is present within the effective area.

4. The traveling control apparatus according to claim 3, wherein the control target setting unit is configured to set a vehicle that is traveling on the merging lane and whose side face is detected as a target of the conformity determination.

5. The traveling control apparatus according to claim 2, wherein the control target setting unit is configured to set a vehicle that is traveling on the merging lane and whose side face is detected as a target of the conformity determination.

6. The traveling control apparatus according to claim 2, wherein, when the measured distance is less than a predetermined value, the first threshold becomes greater for higher speeds of the first vehicle.

7. The traveling control apparatus according to claim 1, wherein, in performing the conformity determination, the control target setting unit is configured to set an effective area extending from the first vehicle in a lateral direction according to a condition, and detect whether the third vehicle subjected to the conformity determination is present within the effective area.

8. The traveling control apparatus according to claim 7, wherein the control target setting unit is configured to set a vehicle that is traveling on the merging lane and whose side face is detected as a target of the conformity determination.

9. The traveling control apparatus according to claim 1, wherein the control target setting unit is configured to set a vehicle that is traveling on the merging lane and whose side face is detected as a target of the conformity determination.

10. A traveling control apparatus comprising a computer device configured to perform control that causes a first vehicle to travel at a set constant vehicle speed or to travel following a second vehicle traveling in front of the first vehicle, the computer device comprising circuitry configured to:

perform a conformity determination as to whether a third vehicle detected on a merging lane that merges with a traveling lane on which the first vehicle travels is a vehicle intending to enter a position immediately before the first vehicle;

set, based on a result of the conformity determination, the third vehicle as a merging vehicle serving as a target to follow; and control the first vehicle to travel following the merging vehicle set as the target to follow, wherein the circuitry is further configured to acquire, from a map locator, information indicating the merging lane; and recognize, based on the information, a merging area on the traveling lane where the merging lane merges into the traveling lane, the merging area being defined based on a start point of the merging lane and an end point of the merging lane;

perform the conformity determination only when the first vehicle is traveling in the merging area; and in performing the conformity determination, (i) compare time to contact between the first vehicle and the third vehicle subjected to the conformity determination to a first threshold;

(ii) in response to determining that the time to contact is less than or equal to the first threshold, select a second threshold for an acceleration rate of the third vehicle based on a relative speed between the first vehicle and the third vehicle, and compare the acceleration rate of the third vehicle to the second threshold; and (iii) refrain from setting the third vehicle as the target to follow when the acceleration rate of the third vehicle is less than the second threshold.

11. A traveling control apparatus comprising a computer device configured to perform control that causes a first vehicle to travel at a set constant vehicle speed or to travel following a second vehicle traveling in front of the first vehicle, the computer device comprising a control target setting unit configured to perform a conformity determination as to whether a third vehicle detected on a merging lane that merges with a traveling lane on which the first vehicle travels is a vehicle intending to enter a position immediately before the first vehicle, and set, based on a result of the conformity determination, the third vehicle as a merging vehicle serving as a target to follow, and a following control unit configured to perform control to cause the first vehicle to travel following the merging vehicle set by the control target setting unit as the target to follow, wherein the control target setting unit is configured to perform, in the conformity determination, a process for comparing an acceleration rate of the third vehicle subjected to the conformity determination with a threshold, the threshold being selected based on a relative speed between the first vehicle and the third vehicle.

12. The traveling control apparatus according to claim 11, wherein the threshold is selected based on a speed of the first vehicle or a measured distance between the first vehicle and the third vehicle subjected to the conformity determination.

13. The traveling control apparatus according to claim 12, wherein, in performing the conformity determination, the control target setting unit is configured to:

set an effective area extending from the first vehicle in a lateral direction according to a condition; and detect whether the third vehicle subjected to the conformity determination is present within the effective area.

14. The traveling control apparatus according to claim 13, wherein the control target setting unit is configured to set a vehicle that is traveling on the merging lane and whose side face is detected as a target of the conformity determination.

15. The traveling control apparatus according to claim 12, wherein the control target setting unit is configured to set a vehicle that is traveling on the merging lane and whose side face is detected as a target of the conformity determination.

16. The traveling control apparatus according to claim 12, wherein, when the measured distance is less than a predetermined value, the threshold becomes greater for higher speeds of the first vehicle.

17. The traveling control apparatus according to claim 11, wherein, in performing the conformity determination, the control target setting unit is configured to:

set an effective area extending from the first vehicle in a lateral direction according to a condition; and detect whether the third vehicle subjected to the conformity determination is present within the effective area.

18. The traveling control apparatus according to claim 17, wherein the control target setting unit is configured to set a vehicle that is traveling on the merging lane and whose side face is detected as a target of the conformity determination.

19. The traveling control apparatus according to claim 11, wherein the control target setting unit is configured to set a vehicle that is traveling on the merging lane and whose side face is detected as a target of the conformity determination.

20. A traveling control apparatus comprising a computer device configured to perform control that causes a first vehicle to travel at a set constant vehicle speed or to travel following a second vehicle traveling in front of the first vehicle, the computer device comprising circuitry configured to perform a conformity determination as to whether a third vehicle detected on a merging lane that merges with a traveling lane on which the first vehicle travels is a vehicle intending to enter a position immediately before the first vehicle, set, based on a result of the determination, the third vehicle as a merging vehicle serving as a target to follow, and perform control to cause the first vehicle to travel following the merging vehicle set by the circuitry as the target to follow, wherein the circuitry is configured to perform, in the conformity determination, a process for comparing an acceleration rate of the third vehicle subjected to the determination with a threshold, the threshold being selected based on a relative speed between the first vehicle and the third vehicle.

* * * * *